United States Patent
Gibanel et al.

(10) Patent No.: US 12,377,438 B2
(45) Date of Patent: *Aug. 5, 2025

(54) ALKALI-SOLUBLE RESIN ADDITIVES AND COATING COMPOSITIONS INCLUDING SUCH ADDITIVES

(71) Applicant: SWIMC LLC, Cleveland, OH (US)

(72) Inventors: Sebastien Gibanel, Givry (FR); Marie Braillon-Girard, Tournus (FR); Samuel Puaud, Tournus (FR)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,152

(22) Filed: Jun. 22, 2023

(65) Prior Publication Data

US 2023/0390802 A1  Dec. 7, 2023

Related U.S. Application Data

(63) Continuation of application No. 16/342,880, filed as application No. PCT/US2017/057378 on Oct. 19, 2017, now Pat. No. 11,717,852.

(60) Provisional application No. 62/410,255, filed on Oct. 19, 2016.

(51) Int. Cl.

| | | |
|---|---|---|
| *C09D 7/65* | (2018.01) | |
| *B05D 7/14* | (2006.01) | |
| *B05D 7/22* | (2006.01) | |
| *B65D 23/02* | (2006.01) | |
| *B65D 25/14* | (2006.01) | |
| *B65D 51/00* | (2006.01) | |
| *C08F 2/22* | (2006.01) | |
| *C08F 212/08* | (2006.01) | |
| *C08F 220/06* | (2006.01) | |
| *C08F 220/14* | (2006.01) | |
| *C08F 220/18* | (2006.01) | |
| *C08L 33/06* | (2006.01) | |
| *C09D 5/02* | (2006.01) | |
| *C09D 7/20* | (2018.01) | |
| *C09D 125/14* | (2006.01) | |
| *C09D 133/02* | (2006.01) | |
| *C09D 133/06* | (2006.01) | |
| *C09D 133/08* | (2006.01) | |
| *C09D 133/10* | (2006.01) | |
| *B05D 1/02* | (2006.01) | |

(52) U.S. Cl.
CPC .............. *B05D 7/227* (2013.01); *B05D 7/14* (2013.01); *B65D 23/02* (2013.01); *B65D 25/14* (2013.01); *B65D 51/00* (2013.01); *C08F 2/22* (2013.01); *C08F 212/08* (2013.01); *C08F 220/06* (2013.01); *C08F 220/14* (2013.01); *C08F 220/1802* (2020.02); *C08F 220/1804* (2020.02); *C08F 220/1806* (2020.02); *C08L 33/06* (2013.01); *C09D 5/022* (2013.01); *C09D 5/024* (2013.01); *C09D 7/20* (2018.01); *C09D 7/65* (2018.01); *C09D 125/14* (2013.01); *C09D 133/02* (2013.01); *C09D 133/066* (2013.01); *C09D 133/08* (2013.01); *C09D 133/10* (2013.01); *B05D 1/02* (2013.01); *B05D 2202/25* (2013.01); *B05D 2520/05* (2013.01); *C08F 2800/20* (2013.01); *C08F 2810/20* (2013.01)

(58) Field of Classification Search
CPC .. B05D 7/227; B05D 7/14; B05D 1/02; C08F 2/22; C08F 220/1804; C08F 220/1806; C08F 212/08; C08F 220/06; C08F 220/14; C08F 220/1802; B65D 23/02; B65D 25/14; B65D 51/00; C09D 133/02; C09D 133/10; C09D 7/65; C09D 5/024; C09D 125/14; C09D 7/20; C09D 5/022; C09D 133/066; C09D 133/08; C08L 33/06
USPC .................................................. 220/62.12
See application file for complete search history.

(56) References Cited

U.S. PATENT DOCUMENTS

| | | |
|---|---|---|
| 3,943,187 A | 3/1976 | Wu |
| 4,071,463 A | 1/1978 | Steinhauer |
| 4,076,676 A | 2/1978 | Sommerfeld |
| 4,076,917 A | 2/1978 | Swift et al. |
| 4,247,439 A | 1/1981 | Matthews et al. |
| 4,285,847 A | 8/1981 | Ting |
| 4,289,674 A | 9/1981 | Christenson et al. |
| 4,305,859 A | 12/1981 | McEwan et al. |
| 4,383,075 A | 5/1983 | Abel |
| 4,383,475 A | 5/1983 | Abel |
| 4,413,015 A | 11/1983 | Anderson et al. |
| 4,443,568 A | 4/1984 | Woo |
| 4,446,258 A | 5/1984 | Chu et al. |

(Continued)

FOREIGN PATENT DOCUMENTS

| | | |
|---|---|---|
| CN | 101040016 | 9/2007 |
| CN | 102492346 | 6/2012 |

(Continued)

OTHER PUBLICATIONS

ExxonMobil, Safety Data Sheet of ESCOR EAA copolymers, 2019. (Year: 2019).*

(Continued)

*Primary Examiner* — Jiangtian Xu
(74) *Attorney, Agent, or Firm* — Mueting Raasch Group

(57) ABSTRACT

A coating composition is provided that is useful in coating metal substrates such as interior and/or exterior surfaces of food or beverage cans. In preferred embodiments, the coating composition is formulated using a physical blend of a preformed_resin system and an alkali-soluble resin additive.

30 Claims, No Drawings

(56) References Cited

U.S. PATENT DOCUMENTS

| | | | |
|---|---|---|---|
| 4,476,262 A | 10/1984 | Chu et al. |
| 4,487,859 A | 12/1984 | Martino |
| 4,499,212 A | 2/1985 | Martino |
| 4,503,173 A | 3/1985 | Martino et al. |
| 4,522,961 A | 6/1985 | Martino et al. |
| 4,522,962 A | 6/1985 | Abbey et al. |
| 4,868,016 A | 9/1989 | Lorah et al. |
| 4,948,834 A | 8/1990 | Baker et al. |
| 4,963,602 A | 10/1990 | Patel |
| 5,043,380 A | 8/1991 | Cole |
| 5,157,078 A | 10/1992 | Woo et al. |
| 5,264,469 A | 11/1993 | Mysliwczyk et al. |
| 5,266,628 A | 11/1993 | Essary et al. |
| 5,296,525 A | 3/1994 | Spencer |
| 5,387,625 A | 2/1995 | Parekh et al. |
| 5,527,840 A | 6/1996 | Chutko et al. |
| 5,532,297 A | 7/1996 | Woo et al. |
| 5,714,539 A | 2/1998 | Perez et al. |
| 5,830,952 A | 11/1998 | Pedersen et al. |
| 5,869,552 A | 2/1999 | Pedersen et al. |
| 5,877,239 A | 3/1999 | Craun et al. |
| 5,922,817 A | 7/1999 | Pedersen et al. |
| 6,008,273 A | 12/1999 | Leibelt et al. |
| 6,518,334 B1 | 2/2003 | Calhoun et al. |
| 6,710,113 B2 | 3/2004 | Weitzel |
| 6,762,240 B2 | 7/2004 | Swarup et al. |
| 6,992,121 B1 | 1/2006 | Peters et al. |
| 7,037,584 B2 | 5/2006 | Wind et al. |
| 7,189,787 B2 | 3/2007 | O'Brien et al. |
| 7,592,047 B2 | 9/2009 | O'Brien et al. |
| 7,682,699 B2 | 3/2010 | Wind et al. |
| 7,695,770 B2 | 4/2010 | Dombrowski |
| 7,803,865 B2 | 9/2010 | Moncla et al. |
| 7,947,776 B2 | 5/2011 | Moncla et al. |
| 8,057,893 B2 | 11/2011 | Killilea et al. |
| 8,092,876 B2 | 1/2012 | O'Brien et al. |
| 8,105,744 B2 | 1/2012 | Matsumura |
| 8,142,868 B2 | 3/2012 | O'Brien et al. |
| 8,173,265 B2 | 5/2012 | O'Brien et al. |
| 8,202,578 B2 | 6/2012 | Killilea et al. |
| 8,476,376 B2 | 7/2013 | Grenda et al. |
| 8,617,663 B2 | 12/2013 | O'Brien et al. |
| 8,835,012 B2 | 9/2014 | O'Brien et al. |
| 8,907,005 B2 | 12/2014 | Dombrowski et al. |
| 8,932,718 B2 | 1/2015 | Garner et al. |
| 9,012,027 B2 | 4/2015 | Nabuurs et al. |
| 9,029,470 B2 | 5/2015 | Rademacher et al. |
| 9,096,753 B2 | 8/2015 | Roller et al. |
| 9,181,448 B2 | 11/2015 | Li et al. |
| 9,242,763 B2 | 1/2016 | O'Brien et al. |
| 9,394,456 B2 | 7/2016 | Rademacher et al. |
| 9,404,006 B2 | 8/2016 | Li |
| 9,409,219 B2 | 8/2016 | Niederst et al. |
| 9,415,900 B2 | 8/2016 | O'Brien et al. |
| 9,422,444 B2 | 8/2016 | Lundgard et al. |
| 9,850,395 B2 | 12/2017 | Myers |
| 9,862,854 B2 | 1/2018 | O'Brien et al. |
| 10,759,958 B2 | 9/2020 | Lindenmuth et al. |
| 11,299,574 B2 | 4/2022 | Hibben et al. |
| 2002/0155235 A1 | 10/2002 | Taylor et al. |
| 2004/0236005 A1 | 11/2004 | Scheerder et al. |
| 2010/0063201 A1 | 3/2010 | Yamamoto |
| 2010/0068433 A1 | 3/2010 | Gibanel et al. |
| 2011/0224378 A1 | 9/2011 | Grenda et al. |
| 2012/0118785 A1 | 5/2012 | Kainz et al. |
| 2012/0302690 A1 | 11/2012 | Cunningham et al. |
| 2013/0143039 A1 | 6/2013 | Wilbur et al. |
| 2013/0316109 A1 | 11/2013 | Niederst et al. |
| 2014/0378600 A1 | 12/2014 | Hibben et al. |
| 2015/0004420 A1 | 1/2015 | Hill et al. |
| 2015/0147501 A1 | 5/2015 | Lindenmuth et al. |
| 2015/0147502 A1* | 5/2015 | Lindenmuth ........ C09D 133/08 524/522 |
| 2015/0197597 A1 | 7/2015 | Gallucci et al. |
| 2015/0197657 A1 | 7/2015 | Niederst et al. |
| 2016/0009941 A1 | 1/2016 | Rademacher |
| 2016/0017171 A1 | 1/2016 | Li et al. |
| 2016/0024325 A1 | 1/2016 | Li |
| 2016/0122581 A1 | 5/2016 | You et al. |
| 2016/0297994 A1 | 10/2016 | Kuo et al. |
| 2016/0376446 A1 | 12/2016 | Gibanel et al. |
| 2017/0002227 A1 | 1/2017 | Gibanel et al. |
| 2017/0369603 A1 | 12/2017 | Gibanel et al. |
| 2018/0291227 A1 | 10/2018 | Singer et al. |
| 2019/0023940 A1 | 1/2019 | Chasser et al. |
| 2019/0249029 A1 | 4/2019 | Gibanel et al. |
| 2019/0282398 A1 | 9/2019 | Gao et al. |
| 2020/0247010 A1 | 8/2020 | Gorin et al. |
| 2020/0385602 A1 | 12/2020 | O'Brien et al. |

FOREIGN PATENT DOCUMENTS

| | | |
|---|---|---|
| CN | 102766382 | 11/2012 |
| CN | 103013303 | 4/2013 |
| EP | 0 114 909 A1 | 8/1984 |
| EP | 0 256 391 A2 | 2/1988 |
| EP | 0 101 307 B1 | 5/1989 |
| EP | 0 628 613 A2 | 12/1994 |
| EP | 1 474 454 B1 | 11/2009 |
| EP | 3 303 490 B1 | 4/2018 |
| GB | 1 555 868 | 11/1979 |
| GB | 1 574 721 | 9/1980 |
| JP | 53-39387 | 4/1978 |
| JP | 5-43830 | 2/1993 |
| JP | 2002-1555234 A | 5/2002 |
| JP | 2013-151608 A | 8/2013 |
| JP | 2015-196812 A | 11/2015 |
| WO | WO 2000/00527 | 1/2000 |
| WO | WO 2002/064691 A2 | 8/2002 |
| WO | WO 2005/121595 A2 | 12/2005 |
| WO | WO 2006/045017 | 4/2006 |
| WO | WO 2008/036628 | 3/2008 |
| WO | WO 2008/036629 A2 | 3/2008 |
| WO | WO 2010/097353 A1 | 9/2010 |
| WO | WO 2011/005743 | 1/2011 |
| WO | WO 2011/057781 A2 | 5/2011 |
| WO | WO 2012/089747 A1 | 7/2012 |
| WO | WO 2012/118500 A1 | 9/2012 |
| WO | WO 2012/170623 A2 | 12/2012 |
| WO | WO 2013/191825 A1 | 12/2013 |
| WO | WO 2013/191826 A1 | 12/2013 |
| WO | WO 2014/022703 | 2/2014 |
| WO | WO 2014/089410 A1 | 6/2014 |
| WO | WO 2014/105466 A2 | 7/2014 |
| WO | WO 2014/134442 A1 | 9/2014 |
| WO | WO 2014/139971 A1 | 9/2014 |
| WO | WO 2014/139973 A1 | 9/2014 |
| WO | WO 2014/186285 A1 | 11/2014 |
| WO | WO 2014/186725 | 11/2014 |
| WO | WO 2015/002958 A1 | 1/2015 |
| WO | WO 2015/002961 A1 | 1/2015 |
| WO | WO 2015/006522 A1 | 1/2015 |
| WO | WO 2016/105502 A1 | 6/2016 |
| WO | WO 2016/105504 A1 | 6/2016 |
| WO | WO 2016/196174 A1 | 12/2016 |
| WO | WO 2016/196190 A1 | 12/2016 |
| WO | WO 2017/079437 A1 | 5/2017 |
| WO | WO 2017/112837 | 6/2017 |
| WO | WO 2017/112837 A1 | 6/2017 |
| WO | WO 2017/180895 A1 | 10/2017 |
| WO | WO 2018/013766 A1 | 1/2018 |
| WO | WO 2018/075762 | 4/2018 |
| WO | WO 2018/085052 | 5/2018 |
| WO | WO 2018/185094 | 5/2018 |
| WO | WO 2019/113594 | 6/2019 |
| WO | WO 2019/118697 | 6/2019 |
| WO | WO 2022/147004 | 7/2022 |

OTHER PUBLICATIONS

"Allnex—Phenolic Resins," Product Guide, Phenodur resins, Worldwide (2017), 7 pages.

(56) References Cited

OTHER PUBLICATIONS

"CYMEL 303 Crosslinking Agents," Product Data Sheet, 2000, 2 pages.
"Cytec—Liquid Coating Resins," Product Guide, Asia Pacific, 2006, 15 pages.
"Licocene PP MA 6452 Granules," Product Data Sheet, Clariant Additives, Sep. 12, 2017, 2 pages.
"The Organic Chemistry of Sugars," D.E. Levy and P. Fugedi (ed.), pp. 227-231, CRC Press, 2006.
Application and File History for U.S. Appl. No. 17/720,928, filed Apr. 14, 2022, Inventors: O'Brien et al., 107 pages.
ESCOR EAA Copolymers: MSDS: Exxon Mobil Chemical Company, Spring TX; Nov. 25, 2019 (13 pages).
ExxonMobil, Safety Data Sheet of ESCOR EAA Copolymers, 2019.
European Patent Office, "Notice of Opposition" for EP Application No. 17867891.4, Sep. 5, 2022, 14 pages.
First Examination Report, India Application No. 201917018045, Jan. 25, 2021, 6 pages.
Good, Raymond H,. "Recent advances in metal can interior coatings," ACS Symposium Series, American Chemical Society, 1998, 14 pages.
Information Shell Chemicals: Can coatings based on Epikote resins, Sep. 1991, 2 pages.
Laney, "Elastic Modulus of Poly(ethylene-co-acrylic acid) Copolymers and Ionomers: Effects of Temperature and Relative Humidity," BS Thesis, Princeton University, May 2010, 46 pages.
Larranaga, Michael D. et al., "Hawleys Condensed Chemical Dictionary," Wiley, 2016, 6 pages.
Lawson, David O, "Waterborne Spray Can Coatings," ACS Symposium Series, American Chemical Society, 1978 PPG Industries, 3 pages.
Office Action for Chinese Application No. 201780064566.2, dated Nov. 4, 2020, 14 pages.
Park et al., "Kinetics of latex formation of PBMA latex in the presence of alkali soluble resin using atomic force microscopy", Colloid Polym Sci, 276, pp. 709-714 (1998—the year of publication is sufficiently earlier than the effective U.S. filing date and any foreign priority date so that the particular month of publication is not in issue).
Primid® SF-4510, Technical Data Sheets, Primid® EMS-Chemie AG, 2 sheets (2009—the year of publication is sufficiently earlier than the effective U.S. filing date and any foreign priority date so that the particular month of publication is not in issue).
Primid® XL-552, Technical Data Sheets, Primid® EMS-Chemie AG, 2 sheets (2009—the year of publication is sufficiently earlier than the effective U.S. filing date and any foreign priority date so that the particular month of publication is not in issue).
Stanssens, Dirk et al, "On the mechanism of the esterification of a beta-hydroxy alkylamide with a carboxylic acid," Progress in Organic Coatings, 22 (1993): 379-391.
Tsukahara, N. et al., "Reactive Emulsifiers for Emulsion Polymerization", PCI Paint & Coatings Industry, 7 pages (Sep. 5, 2013).
Wu et al., "Alkali-soluble resins (ASR) and acrylic blends: influence of ASR distribution on latex film and paint properties", J. Coat. Technol. Res., 13 (4) pp. 655-665 (May 20, 2016).
Youngjae Yoo et al., "Preparation of Acrylic Copolymers and Crosslinking Agents and Properties as a Film," Journal of Applied Polymer Science, 112:1587-1594, 2009.
"Acrylic Resin Anti-corrosive Coatings and Applications," Edited by Peng Zhang et al., Chemical Industry Press, $1^{st}$ edition, Sep. 2003; p. 192-194. With machine English translation.
Chinese Reexamination Notice for CN 201780064549.9 issued by the Chinese patent Office on Mar. 28, 2024; 22 pgs including English translation.

\* cited by examiner

ALKALI-SOLUBLE RESIN ADDITIVES AND COATING COMPOSITIONS INCLUDING SUCH ADDITIVES

CROSS REFERENCE TO RELATED APPLICATIONS

This application is a continuation of U.S. application Ser. No. 16/342,880 filed Apr. 17, 2019 and entitled "ALKALI-SOLUBLE RESIN ADDITIVES AND COATING COMPOSITIONS INCLUDING SUCH ADDITIVES", which is a national stage filing under 35 U.S.C. § 371 of International Application No. PCT/US2017/057378 filed Oct. 19, 2017 and entitled "ALKALI-SOLUBLE RESIN ADDITIVES AND COATING COMPOSITIONS INCLUDING SUCH ADDITIVES", which claims the benefit of U.S. Provisional Application No. 62/410,255 filed Oct. 19, 2016 and entitled "STYRENE-FREE ACRYLIC POLYMERS AND COMPOSITIONS CONTAINING SUCH POLYMERS," the disclosures of each of which are incorporated herein by reference in their entirety.

BACKGROUND OF THE INVENTION

Bisphenol A has been used to prepare polymers having a variety of properties and uses. For example, bisphenol A may be reacted with epichlorohydrin to provide polymers useful in packaging coatings. There is a desire to reduce or eliminate the use of certain bisphenol A-derived polymers in food or beverage container coatings. Although a number of replacement coating compositions made without bisphenol A have been proposed, some replacement compositions have exhibited insufficient coating properties such as insufficient corrosion resistance on metal substrates, insufficient flexibility or insufficient toughness.

The balance of coating performance attributes required for a coating composition to be suitable for use as a food or beverage can coatings are particularly stringent and are unique from other coating end uses. As such, coatings designed for other ends uses are not typically suitable for use as food or beverage can coatings.

For example, coatings for use on food or beverage containers should avoid unsuitably altering the taste of the packaged food or beverage products, and should also avoid flaking or chipping into the packaged products. The coatings should also resist chemically aggressive food or beverage products (which can have a complex chemical profile, including salt, acids, sugars, fats, etc.) for extended periods of time (e.g., years). Food or beverage container coatings should also have good adhesion to the underlying substrate and remain sufficiently flexible after curing, because subsequent fabrication and denting during transportation, storage or use (e.g., by dropping) may cause the metal substrate to deform, which will cause the coating to flex. A brittle coating will crack during flexure, exposing the container metal to the packaged products, which can sometimes cause a leak in the container. Even a low probability of coating failure may cause a significant number of containers to leak, given the high number of food and beverage containers produced.

Accordingly, it will be appreciated that what is needed in the art are improved coating compositions that are made without intentionally using bisphenol A, but which exhibit the stringent balance of coating properties to permit the use of such coating compositions on food or beverage containers.

SUMMARY

The present invention provides an additive for use in formulating liquid coating compositions, and especially aqueous coating compositions for use in forming thermoset coatings on substrates such as, for example, metal substrates.

In one aspect, the present invention provides an alkali-soluble resin ("ASR") additive that may be used in combination with resin systems to formulate aqueous coating compositions preferably having one or more improved coating performance properties.

In yet another aspect, the present invention provided an aqueous coating composition suitable for use in forming an adherent coating onto a metal substrate. In preferred embodiments, the coating composition includes a resin system and an ASR additive preferably having a number average molecular weight ("Mn") of at least 1,000, at least 1,500, or at least 2,000.

In yet another aspect, the present invention provides an aqueous inside spray food or beverage can coating composition. In certain preferred embodiments, the coating composition includes a resin system comprising an emulsion polymerized acrylic latex and an ASR additive preferably having an Mn of at least 1,000, at least 1,500, or at least 2,000.

In yet another aspect, the present invention provides a method including providing a coating composition of the present invention, and applying it to a metal substrate. In certain preferred embodiments, the metal substrate is an interior surface of a metal food or beverage can or portion thereof. In some such embodiments, the coating composition is applied via spray application.

In yet another aspect, the present invention provides an article having a metal substrate, wherein at least a portion of the metal substrate has a coating (e.g., a cured thermoset coating) disposed thereon formed from a coating composition of the present invention. In some embodiments, the article is a metal food or beverage can or a portion thereof. In certain preferred embodiments, the article is an aluminum beverage can having an inside spray coating disclosed herein disposed on an interior surface.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set for in the description below. Other features, objects, and advantages of the invention will be apparent from the description and from the claims.

Selected Definitions

Unless otherwise specified, the following terms as used herein have the meanings as provided below.

As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

A group that may be the same or different is referred to as being "independently" something. Substitution on the organic groups of the compounds of the present invention is contemplated. As used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The term "ethylenically unsaturated" refers to a carbon-carbon double or triple bond capable of participating in a free-radical initiated polymerization reaction, and is not intended to encompass the carbon-carbon double bonds present in aryl groups such as, for example, the phenyl group of styrene. Thus, for example, dodecyl benzene sulfonic acid is not considered to include an ethylenically unsaturated group.

The term "on" when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers). Similarly, unless otherwise indicated, the use of a term designating a polymer class such as, for example, "acrylic" is intended to include both homopolymers and copolymers (e.g., polyether-acrylate copolymers).

The term "monomer" includes any reactant molecule used to produce a polymer, and encompasses both single-unit molecules (e.g., an acrylic molecule) and multi-unit molecules (e.g., an acrylic oligomer).

A group that may be the same or different is referred to as being "independently" something. The term "group" also encompasses single atom moieties. Thus, for example, a halogen atom can be a group.

The terms "acrylate" and "acrylic" are used broadly (and interchangeably) herein and encompass materials prepared from, for example, one or more of acrylic acid, methacrylic acid, or any acrylate or methacrylate compound. Thus, for example, a homopolymer consisting entirely of polymerized (meth)acrylic acid would still be an "acrylate" polymer even though no (meth)acrylate monomer was employed.

The term "(meth)" as used in "(meth)acrylate", "(meth) acrylic acid", and the like is intended to indicate that either a hydrogen or methyl group may be attached to the pertinent carbon atom of the monomer. For example "ethyl (meth) acrylate" encompasses both ethyl acrylate and ethyl methacrylate, as well as mixtures thereof.

The term "substantially free" when used with respect to a coating composition, or polymer or other composition, that may contain a particular compound means that the referenced composition contains less than 1,000 parts per million (ppm) of the recited compound whether the compound is mobile in the composition or bound to a constituent of the composition (e.g., as a structural unit of a polymer). The term "essentially free" when used with respect to a coating composition, or polymer or other composition, that may contain a particular compound means that the referenced composition contains less than 100 parts per million (ppm) of the recited compound. The term "essentially completely free" when used with respect to a coating composition, or polymer or other composition, that may contain a particular compound means that the referenced composition contains less than 5 parts per million (ppm) of the recited compound. The term "completely free" when used with respect to a coating composition, or a polymer or other composition, that may contain a particular compound means that the referenced composition contains less than 20 parts per billion (ppb) of the recited compound. When the phrases "free of" (outside the context of the aforementioned phrases), "does not include any" and the like are used herein, such phrases are not intended to preclude the presence of trace amounts of the pertinent structure or compound which may be present, e.g., as environmental contaminants.

As used herein, the term "styrene-free" indicates that styrene was not intentionally used, although trace amounts of contaminating styrene may be present (e.g., due to environmental contamination).

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims.

As used herein, "a," "an," "the," "at least one," and "one or more" are used interchangeably. Thus, for example, a coating composition that comprises "a" surfactant can be interpreted to mean that the coating composition includes "one or more" surfactants.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION

The present invention provides an alkali-soluble resin ("ASR") additive useful in improving one or more coating properties of a variety of coating compositions, and especially aqueous coating compositions for use in forming adherent thermoset coatings on metal substrates. For example, the ARS additive has been found to be useful in formulating aqueous packaging coating compositions (e.g., interior or exterior food or beverage can coatings), and particularly spray applied coating system (e.g., inside spray coating compositions for food or beverage cans).

While not intending to be bound by any theory, it is believed that the use of the ASR may provide one or more benefits to a cured coating such as, for example, improved coating coalescence and/or a smoother coating surface. When used in an interior can coating with carbonated beverages, this may help reduce or eliminate certain issues associated with carbon nucleation.

In preferred embodiments, the ASR additive is an acid- or anhydride-functional polymer. In particularly preferred embodiments, the ASR is an acid- or anhydride-functional acrylic polymer, and even more preferably an organic solution polymerized acid- or anhydride-functional acrylic polymer. Typically, the acid- or anhydride groups are at least partially neutralized with a base to render the ASR additive stably dispersible in aqueous media. Preferred acid- or anhydride-functional polymers include those prepared by conventional free radical polymerization techniques. Suitable examples include those prepared from unsaturated acid- or anhydride-functional monomers, or salts thereof, and other ethylenically unsaturated monomers. Of these, preferred examples include those prepared from at least 15 wt-%, more preferably at least 20 wt-%, more preferably at least 30 wt-%, and even more preferably at least 40 wt-% of unsaturated acid- or anhydride-functional monomer, or salts thereof, and the balance other polymerizable ethylenically unsaturated monomer. Examples of co-monomers include any of those disclosed later herein.

A variety of acid- or anhydride-functional monomers, or salts thereof, can be used to prepare the ASR additive; their selection is dependent on the desired final polymer properties. Preferably, such monomers are ethylenically unsaturated, more preferably, alpha, beta-ethylenically unsaturated. Suitable ethylenically unsaturated acid- or anhydride-functional monomers include monomers having a reactive carbon-carbon double bond and an acidic or anhydride group, or salts thereof. Preferred such monomers have from 3 to 20 carbons, at least 1 site of unsaturation, and at least 1 acid or anhydride group, or salt thereof.

Suitable acid-functional monomers include ethylenically unsaturated acids (mono-protic or diprotic), anhydrides or monoesters of a dibasic acid, which are copolymerizable with the optional other monomer(s) used to prepare the ASR additive. Illustrative monobasic acids are those represented by the structure $CH_2=C(R^1)$—$COOH$, where $R^1$ is hydrogen or an alkyl radical of 1 to 6 carbon atoms. Suitable dibasic acids are those represented by the formulas $R^2(COOH)C=C(COOH)R^3$ and $R^2(R^3)C=C(COOH)R^4COOH$, where $R^2$ and $R^3$ are hydrogen, an alkyl radical of 1-8 carbon atoms, halogen, cycloalkyl of 3 to 7 carbon atoms or phenyl, and $R^4$ is an alkylene radical of 1 to 6 carbon atoms. Half-esters of these acids with alkanols of 1 to 8 carbon atoms are also suitable.

Examples of useful ethylenically unsaturated acid-functional monomers include acids such as, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, or mixtures thereof. Preferred ethylenically unsaturated acid-functional monomers include acrylic acid, methacrylic acid, crotonic acid, fumaric acid, maleic acid, 2-methyl maleic acid, itaconic acid, 2-methyl itaconic acid, and mixtures thereof. Acrylic acid is an example of a particularly preferred ethylenically unsaturated acid-functional monomer.

Examples of suitable ethylenically unsaturated anhydride monomers include compounds derived from the above acids (e.g., as pure anhydride or mixtures of such). Preferred anhydrides include acrylic anhydride, methacrylic anhydride, and maleic anhydride. If desired, aqueous salts of the above acids may also be employed.

In preferred embodiments, the ethylenically unsaturated monomer component used to prepare the ASR additive includes one or more monomers other than an acid- or anhydride-functional monomer. Examples of such other monomers may include one or more of (meth)acrylates (e.g., alkyl (meth)acrylates) and non-(meth)acrylate vinyl monomers. Such monomers may include any suitable combination of groups such as straight chain, branched, cyclic (e.g., aromatic, cycloaliphatic, or polycyclic groups), or reactive groups. For example, any of the ethylenically unsaturated monomer described in U.S. Provisional Application No. 62/410,255 may be used, including, for example, any of the ethylenically unsaturated monomers described therein having a branched organic group, a cyclic group, or a combination thereof.

In some embodiments, the ethylenically unsaturated component includes one or more of styrene or methyl methacrylate.

Suitable alkyl (meth)acrylates include those having the structure: $CH_2=C(R^5)$—$CO$—$OR^6$ wherein $R^5$ is hydrogen or methyl, and $R^6$ is an alkyl group preferably containing one to sixteen carbon atoms. The $R^5$ group can be substituted with one or more, and typically one to three, moieties such as hydroxy, halo, phenyl, and alkoxy, for example. Suitable alkyl (meth)acrylates therefore encompass hydroxy alkyl (meth)acrylates. The alkyl (meth)acrylate typically is an ester of acrylic or methacrylic acid. Preferably, $R^5$ is hydrogen or methyl and $R^6$ is an alkyl group having two to eight carbon atoms.

Examples of suitable alkyl (meth)acrylates include, but are not limited to, methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, benzyl (meth)acrylate, lauryl (meth)acrylate, isobornyl (meth)acrylate, octyl (meth)acrylate, nonyl (meth)acrylate, hydroxyethyl acrylate (HEA), hydroxyethyl methacrylate (HEMA), hydroxypropyl (meth)acrylate (HPMA).

Examples of suitable vinyl monomers include styrene, methyl styrene, halostyrene, isoprene, diallylphthalate, divinylbenzene, conjugated butadiene, alpha-methylstyrene, vinyl toluene, vinyl naphthalene, and mixtures thereof. The vinyl aromatic monomers described below in connection with the acid- or anhydride-functional polymer are also suitable for use in the ethylenically unsaturated monomer component used to make the latex polymer. Styrene is a presently preferred vinyl monomer, in part due to its relatively low cost.

Other suitable polymerizable vinyl monomers for use in the ethylenically unsaturated monomer component may include acrylonitrile, acrylamide, methacrylamide, methacrylonitrile, vinyl acetate, vinyl propionate, vinyl butyrate, vinyl stearate, N-isobutoxymethyl acrylamide, N-butoxymethyl acrylamide, and the like.

In some embodiments, the ASR additive is styrene-free. For example, in some such embodiments, the ASR additive is formed from an ethylenically unsaturated monomer component that includes acrylic acid and methacrylic acid, but not styrene.

In other embodiments, the ASR additive includes styrene. For example, in one embodiment, the ethylenically unsaturated monomer component includes styrene and acrylic acid.

Polymerization of the monomers to form the ASR additive is usually conducted by organic solution polymerization techniques in the presence of a free radical initiator as is well known in the art. Although the preparation of the acid-functional or anhydride-functional polymer is conveniently carried out in solution, neat processes may be used if desired.

The ASR additive may have any suitable acid number. The ASR additive preferably has an acid number of at least 40, at least 100, at least 200, or at least 250 mg KOH per gram of resin. The ASR additive preferably has an acid number of less than 500, less than 450, less than 400, or less than 350 mg KOH per gram of resin. Acid numbers can be measured pursuant to BS EN ISO 3682-1998 standard.

The degree of neutralization may vary considerably depending upon the amount of acid included in the ASR additive, and the degree of solubility or dispersibility of the ASR additive which is desired. Ordinarily in making the ASR additive water-dispersible, the acidity of the ASR additive is at least 25% neutralized, preferably at least 30% neutralized, and more preferably at least 35% neutralized, with base in water.

The acid- or anhydride-groups of the ASR additive may be neutralized using any suitable base. Preferred bases include nitrogen-containing bases such as ammonia or amines (e.g., primary, secondary, or tertiary amines). Examples of suitable amines include trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof.

The ASR additive may have any suitable number average molecular weight ("Mn"). The ASR additive preferably has an Mn of at least 1,000, at least 1,500, at least 2,000, or at least 2,500. The ASR additive preferably has an Mn of less than 50,000, less than 25,000, less than 20,000, or less than 15,000. Mn can be determined using gel permeation chromatography and a polystyrene standard.

The coating composition may include any suitable amount of the ASR additive to achieve the desired effect. The ASR additive is typically present in an additive amount and, as such, is not the primary film forming component. The coating composition preferably includes at least at least 0.25 weight percent ("wt-%"), at least 0.5 wt-%, at least 1 wt-%, or at least 1.25 wt-% of the ASR additive, based on total resin solids in the coating composition. In presently preferred embodiments, the coating composition includes less than 10 wt-%, less than 5 wt-%, less than 3 wt-%, or less than 2 wt-% of the ASR additive, based on total resin solids in the coating composition.

The aqueous coating composition of the present invention includes the ASR additive in combination with a resin system that is preferably a water-soluble or water-dispersible resin system. Examples of suitable such resin system may include resin systems having one or more of: an acrylic polymer, a polyester polymer, a polyether polymer, a polyolefin polymer, or a mixture or copolymer thereof (e.g., a polyester-acrylic, polyether-acrylic, polyolefin-acrylic, etc.). If desired, the resin system can include one or more reactive groups such as, for, example carboxylic groups, hydroxyl groups, oxirane groups, or a mixture thereof.

In preferred embodiments, prior to any cure of the liquid coating composition, the ASR additive is present as a separate component that is not covalently attached to the resin system. For example, the ASR additive may be present in a coating composition including a physical blend of the ASR additive and a preformed resin system. Upon thermal cure of the coating composition, one or more covalent linkages may optionally be formed between the ASR additive and the resin system (such as may occur, for example, between acid groups present on the ASR additive and acid-reactive groups present in the resin system such as, for example, hydroxyl groups).

While the ASR additive may be present during polymerization of the resin system, in preferred embodiments the ASR additive is combined with a preformed (or at least partially preformed) resin system. The ASR additive in a coating composition that includes a latex of Example 2 below is distinct, for example, from the polymeric surfactant (e.g., acid-functional acrylic emulsifier of Example 1) used to prepare the latex and that is present in a coating composition solely due to inclusion of the latex. Stated otherwise, a coating composition that includes a latex such as that of Example 2 below is not considered to include an ASR additive solely by virtue of the inclusion of polymeric surfactant to support the emulsion polymerization of the latex. While not intending to be bound by theory, it is not believed such residual polymeric surfactant from an emulsion polymerization provides the same level of coating performance benefits as, for example, a post-added ASR additive (e.g., combined with an already formed or substantially formed resin system). While not intending to be bound by theory, this difference in performance may be attributable, for example, due to the intimate incorporation of the polymeric surfactant into the latex particles.

Water-dispersible acrylic polymers (e.g., at least partially neutralized acid- or anhydride-functional acrylic polymers) are preferred polymers for inclusion in the resin system, with emulsion polymerized acrylic latexes being particularly preferred. The acrylic polymer is typically a free-radical polymerized polymer formed from ingredients including an ethylenically unsaturated monomer component, which may include any suitable combination of ethylenically unsaturated monomers including, for example, any of those disclosed herein. Examples of suitable water-dispersible acrylic polymers, including emulsion polymerized acrylic latexes are known in the art. Examples of suitable such water-dispersible acrylic polymers may include any of those described in U.S. Pat. Nos. 7,189,787, 9,029,470, 9,181,448, 9,404,006, 9.415,900, U.S. Publication No. US20160009941, WO2015/002958, WO2015/002961 WO2015/006522, WO2016/105504, WO2016/105502, WO2016/196174, WO2016/196190, WO2017/112837, International App. No. PCT/US2017/041858, or U.S. Provisional Application No. 62/410,255. In some embodiments, the water-dispersible acrylic polymer may be styrene containing. In other embodiments, the acrylic polymers may be styrene-free. Examples of suitable styrene-free acrylic polymers are described in U.S. Provisional Application No. 62/410,255.

The emulsion polymerized latex polymers may have any suitable glass transition temperature ("Tg"). In some embodiments, an emulsion polymerized acrylic latex may be used that has a Tg of greater than 20° C., greater than 40° C., greater than 50° C., or greater than 60° C.

The emulsion polymerized latex polymers may be prepared using any suitable materials and processes. For example, one or more ethylenically unsaturated monomer components may be emulsion polymerized in aqueous media with the assistance of one or more emulsifiers, which may be a polymeric surfactant (e.g., salt of a base and acid- or anhydride-functional polymer), a non-polymeric surfactant (e.g., amine-neutralized dodecylbenzene sulfonic acid), or a mixture thereof. In some embodiments, a salt of a base (e.g., an amine) and acid- or anhydride-functional polymer (e.g., an acid- or anhydride-functional organic solution polymerized acrylic polymer) is not used in preparing the emulsion polymerized latex.

The coating compositions of the present invention preferably include at least a film-forming amount of the resin system (e.g., emulsion polymerized acrylic latex) described herein. In preferred embodiments, the coating composition includes at least about 50 wt-%, more preferably at least about 65 wt-%, and even more preferably at least about 80 wt-% or at least about 90 wt-% of the resin system, based on the total resin solids weight of the coating composition. The coating composition includes less than 100 wt-%, more typically less than about 99 wt-%, and even more typically less than about 95 wt-% of the resin system (e.g., emulsion polymerized acrylic latex), based on the total resin solids weight of the coating composition. The above weight percentages are inclusive of any surfactant(s) (e.g., polymeric and/or non-polymeric surfactant) used to make the latex polymer, regardless of whether the surfactant(s) are covalently attached to the emulsion polymerized ethylenically unsaturated monomer component.

While not intending to be bound by theory, it is believed that it can be advantageous that the constituents of the ASR additive be suitably "matched" to the constituents of the resin system to optimize the coating performance benefits provided by the ASR additive. For example, in embodiments in which the ASR additive is an acrylic polymer and the resin system comprises an emulsion polymerized acrylic latex, it may be desirable to use ethylenically unsaturated monomer components to produce each material which are as closely matched as possible (e.g., more than 25 wt-%, more than 40 wt-% the same, more than 50 wt-% the same, or more than 50 wt-% the same ethylenically unsaturated monomers, etc.).

The coating composition may be formulated from the resin system and ASR additive described herein, optionally with the inclusion of one or more additional additives. In embodiments in which the coating composition includes one or more additives, the additives preferably do not adversely affect the latex emulsion or other polymer described herein, or a cured coating formed from the coating composition. For example, such optional additives may be included in the coating composition to enhance composition aesthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow-control agents, thixotropic agents, dispersing agents, antioxidants, adhesion promoters, light stabilizers, curing agents, co-resins, organosilicon materials, and mixtures thereof. Each optional additives is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulfonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in a non-volatile amount of no greater than about 3% by weight, and more preferably no greater than about 1% by weight, based on the total solids weight of the coating composition.

Another optional ingredient is a lubricant (e.g., a wax), which facilitates manufacture of metal closures and other fabricated coated articles by imparting lubricity to coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another optional ingredient is an organosilicon material, such as a siloxane-based and/or polysilicone-based materials. Representative examples of suitable such materials are disclosed in International Publication Nos. WO/2014/089410 and WO/2014/186285.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

The coating composition of the present invention may optionally include one or more crosslinkers. Examples of suitable crosslinkers include hydroxyl-reactive crosslinkers, carboxyl-reactive crosslinkers (e.g., nitrogen-containing carboxyl-reactive crosslinkers "NCCR"), or combinations thereof. In some embodiments, a combination of one or more hydroxyl-reactive crosslinker and one or more-carboxyl reactive crosslinkers may be used. For example, one more beta-hydroxyalkylamide crosslinkers (e.g., PRIMID QM1260 crosslinker) and one or more phenoplast crosslinkers (e.g., resole phenolic crosslinkers) may be used. Preferred crosslinkers are substantially free of each of BPA, BPF, BPS, including glycidyl ether compounds thereof (e.g., BADGE), and epoxy novolacs.

Preferred carboxyl-reactive crosslinkers include NCCR crosslinkers, which typically include two or more nitrogen atoms and, in some embodiments, two total nitrogen atoms. In some embodiments, one or more (and more preferably two or more) nitrogen atoms are present in an amide group, an aziridine group, an imide group, a diimide group, an oxazoline group, a urethane group, or a combination thereof. In a preferred embodiment, the NCCR crosslinker includes two or more amide groups. It is contemplated, however, that the NCCR crosslinker may contain a single amide group such as, for example, a poly-substituted amide group having two or more hydroxyl groups.

In certain preferred embodiments, the NCCR crosslinker includes one or more, and more preferably two or more, groups having the structure of the below Formula (I):

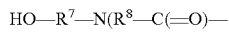

wherein each $R_7$ is independently an organic group, and each $R_8$ is independently hydrogen or an organic group.

As shown in Formula (I), the depicted hydroxyl group can be a primary hydroxyl group, secondary hydroxyl group, or tertiary hydroxyl group depending on the structure of $R^7$. In some embodiments, the hydroxyl group is a primary hydroxyl group.

$R^7$ can include any suitable number of carbon atoms, but will typically include from 2 to 10 carbons atoms, more typically from 2 to 8 carbon atoms, more typically from 2 to 6 carbons atoms, and even more typically from 2 to 4 carbon atoms. $R^7$ will typically include at least two carbon atoms in a chain connected on one end to the depicted nitrogen atom and on the other end to the depicted hydroxyl group. In an embodiment, the depicted hydroxyl group is attached directly to a first carbon atom, which is attached directly to a second carbon, which is in-turn attached directly to the depicted nitrogen atom. In some embodiments $R^7$, is —$(CH_2)_2$—.

In some embodiments, $R^7$ is an alkylene group preferably containing from 1 to 5 carbon atoms (e.g., methylene, ethylene, n-propylene, sec-propylene, n-butyl, sec-butylene, tert-butylene, pentylene, etc.).

In some embodiments, $R^8$ is an organic group that includes a hydroxyl group. In some such embodiments, $R^8$ is of the formula HO—$R^7$—, wherein $R^7$ is as described above. Examples of such $R^8$ groups include hydroxyl alkyl groups preferably having from 1 to 5 carbon atoms (e.g., hydroxy-ethyl, 3-hydroxy-propyl, 2-hydroxy-propyl, 4-hydroxy-butyl, 3-hydroxy-butyl, 2-hydroxy-2-propyl-methyl, 5-hydroxy-pentyl, 4-hydroxy-pentyl, 3-hydroxy-pentyl, 2-hydroxy-pentyl and the pentyl isomers). An example of an NCCR crosslinker including such an $R^8$ group is provided below (which is believed to be the structure of the PRIMID XL-552 product commercially available from EMS):

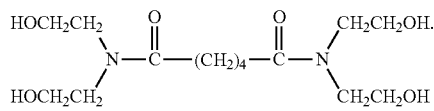

In some embodiments, the NCCR crosslinker is a compound having the structure of the below Formula (II):

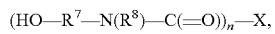

wherein:
$R^7$ and $R^8$ are as described above,
n is 2 or more, and
X is a polyvalent organic group.

In some embodiments, X is an alkylene group. In some embodiments, X is a —$(CH_2)_m$— group wherein (i) m is 1 or more, 2 or more, 3 or more, 4 or more, and more typically from 2 to 10 and (ii) one or more hydrogens may be replaced with substituent groups (e.g., organic substituent groups). In an embodiment, X is —$(CH_2)_4$—.

In certain preferred embodiments, the hydroxyl group is located "beta" relative to a nitrogen atom, more preferably a nitrogen atom of an amide bond. Thus, for example, in certain preferred embodiments the NCCR crosslinker is a beta-hydroxyalkylamide compound. Some examples of such compounds include: bis[N,N-di(β-hydroxy-ethyl)]adip- amide, bis[N,N-di(β-hydroxy-propyl)]succinamide, bis[N,N-di(β-hydroxy-ethyl)]azelamide, bis[N,N-di(β-hydroxy-propyl)]adipamide, bis[N-metil-N-(β-hydroxy-ethyl)] oxamide, and mixtures thereof. The PRIMID QM-1260 product commercially available from EMS is an example of a preferred beta-hydroxyalkyl amide crosslinker. The structure believed to correspond to the PRIMID QM-1260 product is provided below:

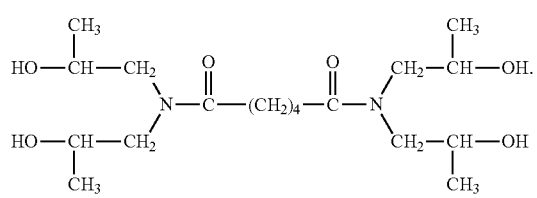

Without intending to be bound by theory, the use of beta-hydroxyalkylamides is preferred in certain embodiments due to the formation of an oxazolinium intermediate that is believed to occur and result in enhanced reactivity of the crosslinker with carboxyl groups. Thus, in some embodiments, the NCCR crosslinker is preferably capable of forming an oxazolinuium intermediate or other carbon-nitrogen heterocyclic intermediate having enhanced reactivity with carboxyl groups. Preferably, such reactive intermediates are formed under typical food or beverage can coating thermal cure conditions. For example, for beverage inside spray coatings, such reactive intermediates are preferably formed at oven bake conditions of from 188 to 199° C. during an oven residence time of 30 to 85 seconds.

The NCCR crosslinker is preferably formed from reactants that do not include formaldehyde.

Any of the well-known, hydroxyl-reactive curing resins can be used. For example, phenoplast, blocked isocyanates, and aminoplast curing agents may be used, as well as combinations thereof.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins.

As examples of other generally suitable crosslinkers are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof.

The total amount of one or more crosslinkers included in the coating composition may depend on the type of crosslinker, the time and temperature of the bake, and molecular weight. If used, the one or more crosslinkers are typically present in an amount of up to about 50% by weight, preferably up to about 30% by weight, more preferably up to about 15% by weight, and optimally less than 10% by weight. If used, the crosslinker is typically present in an amount of at least about 0.1% by weight, more preferably at least about 1% by weight, even more preferably at least about 1.5% by weight, and even more preferably at least about 2% by weight. These weight percentages are based on the total resin solids weight of the coating composition.

In preferred embodiments, the coating composition includes at least 1 wt-%, more preferably at least 2 wt-%, and even more preferably at least 3 wt-% of one or more NCCR crosslinkers, based on total resin solids of the coating composition. Although the upper amount is not restricted, the coating composition preferably includes less than 20 wt-%, more preferably less than 15 wt-%, and even more preferably less than 10 wt-% of one or more NCCR crosslinkers, based on total resin solids of the coating composition. In certain preferred embodiments, the coating composition includes from 4 to 8.5 wt-% of one or more NCCR crosslinkers (e.g., PRIMID QM1260 crosslinker), more preferably from 5 to 7.5 wt-% of one or more NCCR crosslinker, based on the total resin solids of the coating composition. In some embodiments, the coating composition includes at least the above amount of one or more beta-hydroxyalkylamide crosslinkers.

In some embodiments, the coating composition includes an amount of NCCR crosslinker pursuant to the preceding paragraph and also includes from 1 to 10 wt-%, more preferably from 3 to 8 wt-%, and optimally from 4 to 6 wt-% of one or more resole phenolic crosslinkers, based on the total resin solids of the coating composition.

In some embodiments, the coating composition may be cured without the use of an external crosslinker. Additionally, the coating composition may be substantially free of formaldehyde and formaldehyde-containing materials, essentially free of these compounds, essentially completely free of these compounds, or even completely free of these compounds. In preferred embodiments, the coating composition is also substantially free, essentially free, essentially completely free, or completely free of each of BPA, BPF, and BPS, including any diepoxides thereof (e.g., diglycidyl ethers thereof such as the diglycidyl ether of BPA ("BADGE")). In some embodiments, the coating composition is substantially free or completely free of bisphenol compounds.

In some embodiments, the coating composition is also substantially free, essentially free, essentially completely free, or completely free of one or both of styrene and substituted styrene compounds.

In preferred embodiments, the coating composition is substantially free or completely free of halogenated monomers (whether free or polymerized), such as chlorinated vinyl monomers.

In some embodiments, such as for certain spray coating applications (e.g., aqueous inside spray for food or beverage cans including, e.g., aluminum beverage cans), the coating composition may have a total solids weight greater than about 5%, more preferably greater than about 10%, and even more preferably greater than about 15%. In these embodiments, the coating composition may also have a total solids weight less than about 40%, more preferably less than about 30%, and even more preferably less than about 25%. In some of these embodiments, the coating composition may have a total solids weight ranging from about 18% to about 22%. The liquid carrier (e.g., aqueous carrier) may constitute the remainder of the weight of the coating composition.

In preferred embodiments, the coating composition includes an aqueous carrier that includes water and may further include one or more optional organic solvents (e.g., one or more water-miscible solvents). In some embodiments, water constitutes greater than about 20% by weight, more preferably greater than about 35% by weight, and even more preferably greater than about 50% by weight of the total weight of the aqueous carrier. In some embodiments, water constitutes 100% or less, less than about 95% by weight, or less than about 90% by weight of the total weight of the aqueous carrier.

While not intending to be bound by theory, the inclusion of a suitable amount of an organic solvent in the aqueous carrier can be advantageous in some embodiments. Accordingly, in certain embodiments, the one or more organic solvents may constitute greater than 0%, more preferably greater than about 5%, and even more preferably greater than about 10% by weight of the aqueous carrier. In these embodiments, the organic solvents may also constitute less than about 80%, more preferably less than about 65%, and even more preferably less than about 50% or less than about 40% by weight of the aqueous carrier.

The coating composition preferably has a viscosity suitable for a given coating application. In some embodiments (e.g., aqueous inside spray for food or beverage cans), the coating composition may have an average viscosity greater than about 5 seconds, more preferably greater than 10 seconds, and even more preferably greater than about 15 seconds, based on the Viscosity Test described below. In some embodiments e.g., aqueous inside spray for food or beverage cans), the coating composition may also have an average viscosity less than about 40 seconds, more preferably less than 30 seconds, and even more preferably less than about 25, based on the Viscosity Test described below.

The coating composition of the present invention may be applied to a variety of different substrates (typically metal substrates) using a variety of different coating techniques (e.g., spray coating, roll coating, wash coating, dipping, etc.). In certain preferred embodiments, the coating composition is applied as an inside spray coating. As briefly described above, cured coatings formed from the coating composition are particularly suitable for use on metal food and beverage cans (e.g., two-piece cans, three-piece cans, and the like). Two-piece cans (e.g., two-piece beer or soda cans and certain food cans) are typically manufactured by a drawn and ironing ("D&I") process. The cured coatings are also suitable for use in food or beverage contact situations (collectively referred to herein as "food-contact"), and may be used on the inside or outside of such cans.

The disclosed coating compositions may be present as a layer of a mono-layer coating system or as one or more layers of a multi-layer coating system. The coating composition can be used as a primer coat, an intermediate coat, a top coat, or a combination thereof. The coating thickness of a particular layer, and of the overall coating system, will vary depending upon the coating material used, the substrate, the coating application method, and the end use for the coated article. Mono-layer or multi-layer coating systems including one or more layers formed from the disclosed coating composition may have any suitable overall coating thickness, but will typically have an overall average dry coating thickness of from about 1 to about 60 micrometers and more typically from about 2 to about 15 micrometers. Typically, the overall average dry coating thickness for rigid metal food or beverage can applications will be about 3 to about 10 micrometers. Coating systems for use on closures (e.g., twist-off metal closures) for food or beverage containers may have an overall average dry coating thickness up to about 15 micrometers. In certain embodiments in which the coating composition is used as an interior coating on a drum (e.g., a drum for use with food or beverage products), the overall average dry coating thickness may be approximately 25 micrometers.

The metal substrate used in forming rigid food or beverage cans, or portions thereof, typically has an average thickness in the range of about 125 micrometers to about 635 micrometers. Electro-tinplated steel, cold-rolled steel and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed coating compositions may be applied to a substrate either prior to, or after, the substrate is formed into an article such as, for example, a food or beverage container or a portion thereof. In one embodiment, a method of forming food or beverage cans is provided that includes: applying a coating composition described herein to a metal substrate (e.g., applying the composition to the metal substrate in the form of a planar coil or sheet), hardening the composition, and forming (e.g., via stamping or other deformation process) the substrate into a packaging container or a portion thereof (e.g., a food or beverage can or a portion thereof). For example, two-piece or three-piece cans or portions thereof such as riveted beverage can ends (e.g., soda or beer cans) having a cured coating of the disclosed coating composition on a surface thereof can be formed in such a method. In another embodiment, a method of forming food or beverage cans is provided that includes: providing a packaging container or a portion thereof (e.g., a food or beverage can or a portion thereof), applying a coating composition described herein to the inside, outside or both inside and outside portions of such packaging container or a portion thereof (e.g., via spray application, dipping, etc.), and hardening the composition.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If a metal coil is the substrate to be coated, curing of the applied coating composition may be conducted, for example, by heating the coated metal substrate over a suitable time period to a peak metal temperature ("PMT") of preferably greater than about 177° C. More preferably, the coated metal coil is heated for a suitable time period (e.g., about 5 to 900 seconds) to a PMT of at least about 218° C.

In some embodiments, the coating composition is an inside spray coating composition capable of being spray applied on an interior of a food or beverage can (e.g., a 2-piece steel or aluminum food or beverage can) to effectively, and evenly, coat the substrate and form a continuous cured coating (e.g., a coating that exhibits a suitable initial metal exposure value, thereby indicating that the substrate has been effectively coated and is free of unsuitable pores or gaps in the coating).

For interior food-contact coatings, and interior coatings for soda beverage cans in particular, preferred Tg for the cured coating include those greater than about 50° C., more preferably greater than about 60° C., even more preferably greater than about 70° C., and in some embodiments, greater than about 80° C. Preferred Tg for the cured coating include those less than about 120° C., more preferably less than about 115° C., even more preferably less than about 110° C., and in some embodiments, less than about 100° C. An example of a suitable DSC methodology is provided below.

In some embodiments, the cured coating preferably exhibits desired properties for use as an interior food-contact coating (e.g., inside spray coating) for food and beverage cans. For example, the cured coating preferably gives a global extraction of less than about 25 parts-per-million (ppm), and more preferably less than about 10 ppm, and even more preferably less than about 1 ppm, pursuant to the Global Extraction test below. Additionally, the cured coating preferably exhibits a metal exposure less than about 5 milliamps (mA), more preferably less than about 2 mA, and even more preferably less than about 1 mA, pursuant to the Initial Metal Exposure test below. In addition, the cured coating is preferably free of or substantially free of blush (e.g., exhibits a blush rating of at least 8, more preferably at least 9, and optimally 10) pursuant to the Blush Resistance test described below. For inside spray beverage can coating compositions, preferred cured coatings give metal exposure values after drop damage of less than 30 mA, more preferred values of less than 20 mA, even more preferred values of less than 10 mA, even more preferred values of less than 3.5 mA, even more preferred values of less than 2.5 mA, and even more preferred values of less than 1.5 mA pursuant to the Metal Exposure After Drop Damage test below.

The coating composition of the present disclosure may also offers utility in other coating applications. These additional applications include, but are not limited to, wash coating, sheet coating, and side seam coatings (e.g., food can side seam coatings). Other commercial coating application and curing methods are also envisioned, for example, electrocoating, extrusion coating, laminating, powder coating, and the like. The coating composition may also be useful in medical or cosmetic packaging applications, including, for example, on surfaces of metered-dose inhalers ("MDIs"), including on drug-contact surfaces.

Because the balance of coating requirements for food or beverage can coatings are particularly stringent and difficult to achieve, it is believed the coating compositions of the present invention may also be suitable for a multitude of other coatings areas, which generally have less stringent coating requirements. For example, the coating compositions of the present invention may be particularly suitable for non-packaging-related coil coating operations (e.g., "industrial" coil coatings). The coating composition may be applied to planar metal stock such as is used, for example, for lighting fixtures; architectural metal skins (e.g., gutter stock, window blinds, siding and window frames); interior or exterior steel building products; HVAC applications; agricultural metal products; industrial coating applications (e.g., appliance coatings); packaging coating applications (e.g., food or beverage cans, drug cans, etc.) and the like. The coating composition may be particularly suited for a coil coating operation where the composition is applied on rapidly moving planar metal coil substrate and then baked at elevated temperatures (e.g., >100° C.) as the coated substrate travels toward an uptake coil winder.

Polymers and coating compositions such as those described in the Examples may be evaluated using a variety of tests including:

1. Viscosity Test

This test measures the viscosity of a latex emulsion or coating composition for rheological purposes, such as for sprayability and other coating application properties. The test is performed pursuant to ASTM D1200-88 using a Ford Viscosity Cup #4 at 25° C. The results are measured in the units of seconds.

2. Curing Conditions

For beverage inside spray bakes, the curing conditions typically involve maintaining the temperature measured at the can dome at 188° C. to 199° C. for at least 30 seconds.

3. Initial Metal Exposure

This test method determines the amount of the inside surface of the can that has not been effectively coated by the sprayed coating. This determination is made through the use of an electrically conductive solution (1% NaCl in deionized water). The interior "inside spray" coating is typically applied using a high pressure airless spray. The following film weights are typically used: 1.6 grams per square meter ("gsm") for a beer can, 2.3 gsm for a soda can, and 3.4 gsm for a can intended for use in packaging a "hard-to-hold" product.

The coated can is filled with this room-temperature conductive solution, and an electrical probe is attached in contact to the outside of the can (uncoated, electrically conducting). A second probe is immersed in the salt solution in the middle of the inside of the can.

If any uncoated metal is present on the inside of the can, a current is passed between these two probes and registers as a value on an LED display of a suitable measurement apparatus. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings give metal exposure values of less than 3 mA, more preferred values of less than 2 mA, and even more preferred values of less than 1 mA. Commercially acceptable metal exposure values are typically less than 2.0 mA on average.

4. Can Formation

This is a flexibility test for a coating, and correlates to how an inside-spray coating will withstand a can formation process (e.g., necking steps). In this test, the coated can undergoes a can formation process, including a necking step and bottom dome reformation. The formed can is then tested in the electrically conductive solution following the same steps discussed above in the Initial Metal Exposure test.

5. Metal Exposure After Drop Damage

Drop damage resistance measures the ability of the coated container to resist cracks after being in conditions simulating dropping of a filled can. The ability of a coating to withstand drop damage without rupturing can also be indicative of the ability of the coating to withstand post-coating fabrication steps such as dome reformation and necking. The presence of cracks is measured by passing electrical current via an electrolyte solution, as previously described in the Initial Metal Exposure section. A coated container is filled with the electrolyte solution (1% NaCl in deionized water) and the initial metal exposure is recorded. The electrolyte solution is removed and the can is then filled with room-temperature tap water. For two-piece "inside spray" beverage cans, the film weights described in the Initial Metal Exposure test can be used.

The water-filled can, which does not include a "top" can end, is dropped through a vertical cylindrical tube having a 2 and 7/8 inch (7.3 centimeter) internal diameter, can bottom down, onto two opposing impact wedges (each wedge provides an inclined plane angled upwards at 33 degrees relative to a horizontal plane orthogonal to the vertical cylindrical tube, with the inclined planes angled outward relative to one another). The impact wedges are positioned relative to the cylindrical tube such that two dents are formed opposite one another in the rim area where the can bottom end meets the sidewall (typically referred to as the "chime" of a beverage can). The water-filled can is dropped through the tube from a 24-inch (61 centimeter) height (as measured between the can bottom and the point of impact on the impact wedges) onto the inclined planes.

Water is then removed from the can and metal exposure is again measured as described above. If there is no damage, no change in current (mA) will be observed relative to the Initial Metal Exposure value. Typically, an average of 6 or 12 container runs is recorded. The metal exposures results for before and after the drop are reported as absolute values. The lower the milliamp value, the better the resistance of the coating to drop damage. Preferred coatings give metal exposure values after drop damage of less than 3.5 mA, more preferred values of less than 2.5 mA, and even more preferred values of less than 1.5 mA.

6. Adhesion

Adhesion testing is performed to assess whether the coating adheres to the coated substrate. The adhesion test is performed according to ASTM D 3359-Test Method B, using SCOTCH 610 tape, available from 3M Company of Saint Paul, Minn. Adhesion is generally rated on a scale of 0-10 where a rating of "10" indicates no adhesion failure (best), a rating of "9" indicates 90% of the coating remains adhered, a rating of "8" indicates 80% of the coating remains adhered, and so on. Adhesion ratings of 10 are typically desired for commercially viable coatings.

7. Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "10" indicates no blush (best) and a rating of "0" indicates complete whitening of the film (worst). Blush ratings of 7 or higher are typically desired for commercially viable coatings, and optimally 9-10.

To assess blush, the coating composition to be assessed is spray applied using an airless sprayer to a standard aluminum beverage can.

8. Corrosion Resistance

These tests measure the ability of a coating to resist attack by solutions of different levels of aggressiveness. Briefly, a given coating is subjected to a particular solution, as described below, and then measured for adhesion and blush resistance (or whitening), each also described below. For each test, a result is given using a scale of 0-10, based on the Adhesion Resistance and/or Blush Resistance, where a rating of "10" is best and a rating of "0" is worst.

A. Acetic Acid Solution

A 3% solution of acetic acid ($C_2H_4O_2$) in deionized water is prepared and heated to 100° C. Coated panels are immersed in the heated solution for 30 minutes and then removed, rinsed, and dried. Samples are then evaluated for adhesion and blush, as previously described.

B. Citric Acid Solution

A 2% solution of citric acid ($C_6H_8O_7$) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

9. Pasteurization

The Sterilization or pasteurization test determines how a coating withstands the processing conditions for different types of food products packaged in a container. Typically, a coated substrate is immersed in a water bath and heated for 5-60 minutes at temperatures ranging from 65° C. to 100° C. For the present evaluation, the coated substrate was immersed in a deionized water bath for 45 minutes at 85° C. The coated substrate was then removed from the water bath and tested for coating adhesion and blush as described above. Commercially viable coatings preferably provide adequate pasteurization resistance with perfect adhesion (rating of 10) and blush ratings of 5 or more, optimally 9-10.

10. Glass Transition Temperature ("Tg")

Samples for differential scanning calorimetry ("DSC") testing may be prepared by first applying the liquid resin composition onto aluminum sheet panels. The panels are then baked in a Fisher Isotemp electric oven for 20 minutes at 300° F. (149° C.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

11. Global Extraction

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm).

The extraction procedure used in the current invention is described in 21 CFR § 175.300 paragraph (e)(4)(xv) with the following modifications to ensure worst-case scenario performance: (1) the alcohol (ethanol) content is increased to 10% by weight, and (2) the filled containers are held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values are calculated based on surface area of the can (no end) of 44 square inches with a volume of 355 milliliters. Preferred coatings give global extraction results of less than 50 ppm, more preferred results of less than 10 ppm, even more preferred results of less than 1 ppm. Most preferably, the global extraction results are optimally non-detectable.

12. Necking Test

This test measures the flexibility and adhesion of the film following commercial necking process. Necking is done to facilitate the application of a container end that allows sealing the container. The test involves applying the coating to the container at a recommended film thickness and subjecting the container to a recommended bake (see above can, coating, and bake specifications for items 2-4). Prior to the necking process, sample cans typically will have a metal exposure value of <1.0 mA (average of 12 cans) when evaluated using an electrolyte solution as described above. After the necking process, cans should display no increase in metal exposure compared to the average for 12 non-necked cans. Elevated mA values indicate a fracture in the film which constitutes film failure.

EXAMPLES

The following examples are offered to aid in understanding of the present invention and are not to be construed as limiting the scope thereof. It is to be understood that the particular examples, materials, amounts, and procedures are to be interpreted broadly in accordance with the scope and spirit of the inventions as set forth herein. Unless otherwise indicated, all parts and percentages are by weight and all molecular weights are number average molecular weight. Unless otherwise specified, all chemicals used are commercially available from, for example, Sigma-Aldrich, St. Louis, Missouri.

Example 1: Styrene-Free Acid-Functional Acrylic Emulsifier

A premix of 336.35 parts glacial methacrylic acid, 723.15 parts ethyl acrylate (EA), 622.25 parts cyclohexyl methacrylate ("CHMA"), 20.22 parts n-butanol, and 36.99 parts Luperox 26 initiator was prepared in a monomer premix vessel. To a reaction vessel equipped with a stirrer, reflux condenser, thermocouple, heating and cooling capability, and inert gas blanket, 737.64 parts n-butanol and 42.89 parts deionized water were added. With agitation and an inert blanket, the reaction vessel was heated to 97° C. to 102° C. with reflux occurring. Once within the temperature range, 5.74 parts Luperox 26 initiator was added. Five minutes after the Luperox 26 initiator addition, the monomer-initiator premix was added to the reaction vessel over two and a half hours maintaining the temperature range of 97° C. to 102° C. with reflux and cooling as needed. After the premix additions, the monomer-initiator premix vessel was rinsed with 83.33 parts n-butanol going into the reaction vessel. Immediately after rinsing, a second initiator premix of 7.33 parts Luperox 26 initiator and 60.67 parts n-butanol was added to the reaction vessel over thirty minutes maintaining the temperature range of 97° C. to 102° C. At the end of the addition, the premix vessel was rinsed with 15.5 parts n-butanol and the rinse was added to the reaction vessel. Thirty minutes after rinsing the initiator premix vessel, 1.43 parts Luperox 26 initiator was added to the reaction vessel and rinsed with 40.44 parts n-butanol. The ingredients where allowed to react an additional two hours, at which time 202.22 parts n-butanol and 6.74 parts deionized water were added and the reaction vessel was cooled to less than 60° C. This process gave an acrylic polymeric emulsifier with solids (i.e. non-volatile or "NV") of ~58.0%, with an acid number of ~125 mg KOH/g resin, a Brookfield viscosity of ~25,000 centipoise at 80° F., an Mn of 10,680, a Mw of 37,240, and polydispersity index (PDI) of 3.5. The glass transition temperature (Tg) using differential scanning calorimetry ("DSC") was 55° C.

Example 2: Styrene-Free Latex

To a reaction vessel equipped with a stirrer, reflux condenser, thermocouple, heating and cooling capability, and inert gas blanket, 111.96 parts of deionized water and 483.35 parts of the acid-functional acrylic polymeric emulsifier of Example 1 were added to the reaction vessel. Next, 32.79 parts dimethyl ethanol amine ("DMEOA") was added over 5-10 minutes while the temperature of the reaction mixture was allowed to increase. The DMEOA addition vessel was rinsed with 6.32 parts deionized water, and the rinse was added to the reaction vessel. Next, 850.30 parts deionized water was added over 30-45 minutes while heating the reaction vessel to 50° C. In a separate vessel, 287.76 parts CHMA, 94.20 parts butyl acrylate, and 38.56 parts glycidyl methacrylate were premixed and stirred until uniform. This monomer premix was then added over 20-25 minutes. When the premix vessel was empty, it was rinsed with 412.61 parts deionized water and the rinse was added to the reaction vessel. The reaction vessel was stirred for 15 minutes to make the contents uniform. Next, 0.811 parts Trigonox TAHP-W85 initiator was added and rinsed with 5.69 parts deionized water. The reaction mixture was stirred for five minutes after which a premix of 0.60 parts erythorbic acid, 51.36 parts deionized water, 0.60 parts DMEOA, and 0.058 parts iron complex was added over one hour. The reaction vessel was allowed to increase in temperature to a maximum of 84° C. When the premix addition was complete, the premix vessel was rinsed with 14.86 parts deionized water and allowed to react for 60 minutes while the temperature allowed to drift down to 55° C. After the 60 minute time, 0.09 parts Trigonox TAHP-W85 initiator was added and rinsed with 0.63 parts deionized water followed by a premix of 0.07 parts erythorbic acid, 5.71 parts deionized water, and 0.07 parts DMEOA rinsed with 1.38 parts deionized water and allowed to react for 60 minutes. The reaction mixture was held for one hour at 55° C. before cooling to below 38° C. This process yielded a latex material containing ~28% solids, a #4 Ford viscosity of 21 seconds at 80° F., an acid number of 53 mg KOH/g resin, a pH of 7.4, and a particle size of 0.12 microns.

Example 3: Styrene-Free Acid-Functional Acrylic Emulsifier

A premix of 132.24 parts glacial methacrylic acid, 165.3 parts butyl acrylate, 130.5 parts VeoVa 9 vinyl ester monomer (commercially available from Hexion; hereinafter "VeoVa 9"), 115.7 parts of methyl methacrylate, 12.76 parts Luperox 26 initiator, 54.62 parts butanol, and 4.65 parts deionized water was prepared in a monomer premix vessel. To a reaction vessel equipped with a stirrer, reflux condenser, thermocouple, heating and cooling capability, and inert gas blanket, 206.71 parts butanol and 10.10 parts deionized water were added. With agitation and an inert blanket, the reaction vessel was heated to 97° C. to 102° C. with reflux occurring. Once within the temperature range, 2.00 parts Luperox 26 initiator was added. Five minutes after the Luperox 26 initiator addition, 14.5 parts VeoVa 9, 6.96 parts methacrylic acid, 6.09 parts methyl methacrylate, and 8.70 parts butyl acrylate were added. After the addition, the monomer-initiator premix was added to the reaction vessel over two and a half hours maintaining the temperature range of 97° C. to 102° C. with reflux and cooling as needed. After the premix additions, the monomer-initiator premix vessel was rinsed with 13.92 parts butanol going into the reaction vessel. Immediately after rinsing, a second initiator premix of 2.53 parts Luperox 26 initiator and 20.92 parts butanol was added to the reaction vessel over thirty minutes maintaining the temperature range of 97° C. to 102° C. At the end of the addition, the premix vessel was rinsed into the reaction vessel with 535 parts butanol. Thirty minutes after rinsing the initiator premix vessel, 0.49 parts Luperox 26 initiator was added to the reaction vessel and rinsed with 13.95 parts butanol. The ingredients were allowed to react an additional two hours. After the two hour time, 0.49 parts Luperox 26 initiator was added and allowed to react for 60 minutes. After the 60 minute time, 2.32 parts deionized water and 69.73 parts butanol was added and the reaction vessel cooled to less than 60° C. This process yielded acrylic polymeric emulsifier with solids of ~56.0% NV, an acid number of ~163 mg KOH/g resin, a Brookfield viscosity of ~52,000 centipoise at 26.7° C., an Mn of 9,100, an Mw of 30,070, and PDI of about 3.3. The glass transition temperature (Tg) using DSC was 88° C.

Example 4: Styrene-Free Latex

To a reaction vessel equipped with a stirrer, reflux condenser, thermocouple, heating and cooling capability, and inert gas blanket, 93.30 parts of deionized water and 402.79 parts of the acid-functional acrylic polymeric emulsifier of Example 3 were added to the reaction vessel. Next, 27.32 parts DMEOA was added over 5-10 minutes while the temperature of the reaction mixture was allowed to increase. The DMEOA addition vessel was rinsed with 5.26 parts deionized water and the rinse was added to the reaction vessel. Next, 708.58 parts deionized water was added over 30-45 minutes while heating the reaction vessel to 50° C. In a separate vessel, 239.80 parts of VeoVa 9 vinyl ester monomer, 78.50 parts butyl acrylate, and 32.13 parts glycidyl methacrylate were premixed and stirred until uniform. This monomer premix was added to the reaction vessel over 20 minutes. When the premix vessel was empty it was rinsed with 343.84 parts deionized water and the rinse was added to the reaction vessel. The reaction vessel was stirred for 15 minutes to make the contents uniform. Next, 0.680 parts Trigonox TAHP-W85 initiator was added and rinsed with 2.36 parts deionized water. The reaction vessel was stirred for five minutes after which a premix of 0.50 parts erythorbic acid, 42.80 parts deionized water, 0.50 parts DMEOA, and 0.05 parts iron complex was added over one hour. The reaction vessel was allowed to increase in temperature to a maximum of 62° C. When the premix addition was complete, the premix vessel was rinsed with 12.38 parts deionized water and allowed to react for 60 minutes while the temperature allowed to drift down to 55° C. After the 60 minute time, 0.08 parts Trigonox TAHP-W85 initiator was added and rinsed with 0.53 parts deionized water followed by a premix of 0.06 parts erythorbic acid, 4.76 parts deionized water, and 0.06 parts DMEOA and allowed to react for 60 minutes. After the 60 minute time, 0.08 parts Trigonox TAHP-W85 initiator was added and rinsed with 0.53 parts deionized water followed by a premix of 0.06 parts erythorbic acid, 4.76 parts deionized water, and 0.06 parts DMEOA rinsed with 1.38 parts deionized water. The material was held for one hour at 55° C. before cooling to below 38° C. This process yielded a latex material with ~28% solids, a #4

Ford viscosity of 29 seconds at 26.7° C., an acid number of ~67 mg KOH/g resin, a pH of ~7.3, and a particle size of 0.2 microns.

Example 5: Styrene-Containing Acid-Functional Acrylic Emulsifier

A premix of 115.982 parts glacial methacrylic acid, 249.361 parts ethyl acrylate, 214.567 parts styrene, 47.649 parts butanol, and 4.649 parts deionized water was prepared in a monomer premix vessel. In a separate vessel, an initiator premix of 12.756 parts Luperox 26 initiator and 6.973 parts butanol was prepared. To a reaction vessel equipped with a stirrer, reflux condenser, thermocouple, heating and cooling capability, and inert gas blanket, 206.71 parts butanol and 10.14 parts deionized water were added. With agitation and an inert blanket, the reaction vessel was heated to 97° C. to 102° C. with reflux occurring. Once within the temperature range, 1.979 parts Luperox 26 initiator was added. Five minutes after the Luperox 26 initiator addition, the monomer premix and the initiator premix was added simultaneously to the reaction vessel over two and a half hours maintaining the temperature range of 97° C. to 102° C. with reflux and cooling as needed. After the premix additions, the monomer premix vessel was rinsed with 10.46 parts butanol and the initiator premix vessel was rinsed with 3.487 parts butanol, and both rinses were added to the reaction vessel. Immediately after rinsing, a second initiator premix of 2.528 parts Luperox 26 initiator and 20.919 parts butanol was added to the reaction vessel over thirty minutes maintaining the temperature range of 97° C. to 102° C. At the end of the addition, the premix vessel was rinsed with 5.346 parts butanol and the rinse was added to the reaction vessel. Thirty minutes after rinsing the initiator premix vessel, 0.494 parts Luperox 26 initiator was added to the reaction vessel and rinsed with 13.946 parts butanol. The ingredients were allowed to react an additional two hours when 69.73 parts butanol and 2.324 parts deionized water were added and the reaction vessel was cooled to less than 60° C. This process yielded an acrylic polymeric emulsifier with solids of 58.0% NV, an acid number of ~130 mg KOH/g resin, a Brookfield viscosity of about 22,000 centipoise at 26.7° C., an Mn of 12,000, a Mw of 29,500, and PDI of about 2.5. The Tg using DSC was 68° C.

Example 6: Styrene-Containing Latex

To a reaction vessel equipped with a stirrer, reflux condenser, thermocouple, heating and cooling capability, and inert gas blanket, 201.394 parts acid-functional acrylic polymeric emulsifier of Example 5 and 46.65 parts deionized water were added to the reaction vessel. Next, 13.661 parts DMEOA was added over 5-10 minutes with the temperature of the material allowed to increase. The DMEOA was rinsed with 2.632 parts deionized water and the rinse was added to the reaction vessel. Next, 354.29 parts deionized water was added over 30-45 minutes while heating the reaction vessel to 50° C. In a separate vessel, 119.898 parts styrene, 39.248 parts butyl acrylate, and 16.067 parts glycidyl methacrylate were premixed and stirred until uniform. This monomer premix was then added to the reaction vessel over 20-25 minutes. When the premix vessel was empty it was rinsed with 171.92 parts deionized water and the rinse was added to the reaction vessel. The reaction vessel was stirred for 15 minutes to make the contents uniform. Next, 0.338 parts Trigonox TAHP-W85 initiator was added and rinsed with 2.369 parts deionized water. The reaction mixture was stirred for five minutes after which a premix of 0.248 parts erythorbic acid, 21.398 parts deionized water 0.248 parts DMEOA, and 0.024 parts iron complex were added over one hour. The reaction vessel was allowed to increase in temperature to a maximum of 84° C. When the premix addition was complete, the premix vessel was rinsed with 6.19 parts deionized water and allowed to react for 60 minutes while the temperature was allowed to drift down to 55° C. After the 60 minute time, 0.038 parts Trigonox TAHP-W85 initiator was added and rinsed with 0.263 parts deionized water followed by a premix of 0.028 parts erythorbic acid, 2.378 parts deionized water and 0.028 parts DMEOA rinsed with 1.69 parts deionized water. The material was held for 60 minutes at 55° C. before cooling to below 38° C. This process yielded latex materials containing 28.2-30.2% solids, a #4 Ford viscosity of 15-100 seconds, an acid number of 40-60 mg KOH/g resin, a pH of 7.2-8.2, and a particle size of about 0.07-0.14 microns.

Example 7: Preparation of a Styrene-Free Latex

A styrene-free latex emulsion was prepared using the ingredients provided in the below Table 3.

TABLE 3

|  |  | Weight Parts | Weight % |
|---|---|---|---|
| Reactor A1 | Water | 1280.00 | 37.21 |
|  | Polyethylene glycol sorbitan monolaurate (Glycosperse L-20 KFG surfactant) | 1.92 | 0.0558 |
|  | Dioctyl sodium sulfosuccinate (AEROSOL OT 70 surfactant) | 2.40 | 0.0698 |
|  | Iron sulfate heptahydrate | 0.0045 | 0.0001 |
|  | Water | 45.00 | 1.31 |
| Part B1 | Cyclohexyl methacrylate (CHMA) | 406.55 | 11.82 |
|  | Ethyl Acrylate | 363.64 | 10.57 |
|  | Acrylic Acid | 116.36 | 3.38 |
|  | Hydroxy Ethyl Methacrylate | 105.45 | 3.07 |
|  | 1,4-Butanediol dimethacrylate | 176.00 | 5.12 |
| Part B2 | Polyethylene glycol sorbitan monolaurate (Glycosperse L-20 KFG surfactant) | 9.28 | 0.27 |
|  | Dioctyl sodium sulfosuccinate (AEROSOL OT 70 surfactant) | 12.80 | 0.37 |
|  | Water | 544.00 | 15.81 |
|  | Tertioamyl Hydroperoxide (LUPEROX TAH 85) | 1.60 | 0.0465 |
| Initiator C | Isoascorbic acid | 0.90 | 0.0262 |
|  | DMEAO (dimethyl ethanol amine) | 0.45 | 0.0131 |
|  | Water | 147.20 | 4.28 |
| Part D | WATER FLUSH | 160.00 | 4.65 |
| Spike redox (E) | Tertioamyl Hydroperoxide (LUPEROX TAH 85) | 0.64 | 0.0186 |
|  | Isoascorbic acid | 0.3200 | 0.0093 |
|  | DMEAO | 0.16 | 0.0047 |
|  | Iron sulfate heptahydrate | 0.0032 | 0.0001 |
|  | Water | 32.00 | 0.9303 |
| Spike redox (E2) | Tertioamyl Hydroperoxide (LUPEROX TAH 85) | 0.64 | 0.0186 |
|  | Isoascorbic acid | 0.3200 | 0.0093 |
|  | DMEAO | 0.16 | 0.0047 |
|  | Iron sulfate heptahydrate | 0.0032 | 0.0001 |
|  | Water | 32.00 | 0.9303 |
| Total |  | 3439.80 | 100.00 |

Process

1. Monomer Pre-Emulsion Preparation:
    First, a premix was prepared from all the constituents of part B2. Slow agitation was required at this stage to avoid formation of foam. Once homogeneous, the monomers (part B1) were added under vigorous agitation at room temperature and stirred for 20 minutes. The medium turned white and liquid.

2. Latex Preparation:

The ingredients of Part A1 were loaded in the 6 L reactor equipped with a reflux condenser, thermometer, mechanical stirred, two metering pumps and nitrogen sparge and the reactor was heated up to 80° C., under moderate agitation.

The stable monomer pre-emulsion (resulting from Parts B1 and B2) and the initiator solution (premix part C) were then added in the reactor with two separate lines at a constant rate over 180 minutes at 80° C. and under agitation (120-150 revolutions per minute). Once the monomer addition was completed, Part D1 was added and the mixture held for one hour at 80° C. to reach complete conversion.

The redox package (Part E) was then added in the reactor to reduce as much as possible the level of free monomers in the resin and then the mixture was held for an additional hour.

At this stage, a post-neutralization of the final latex can be envisaged to improve the stability and/or increase the viscosity of the latex.

The reactor was then slowly cooled down to 40° C. and filtered to collect the resulting latex emulsion. The final latex had a non-volatile content ("NVC") of 34 to ~35% (1 g/30 min/180° C.). The resulting latex emulsion is referred to as Example 7, Run 1. Additional latexes were prepared in a similar manner using methyl methacrylate in place of CHMA (Example 7, Run 2).

Example 8: Preparation of Styrene-Free Latexes

Additional latex emulsions were prepared using the process and ingredients of Example 7, with the composition of the monomer premix part B1 employed for each of Runs 1-4 noted below in Table 4. Otherwise the process and materials used were the same as in Example 7. All of the ingredient amounts indicated in the below Table 4 are weight parts.

TABLE 4

| Example 8 Latexes | Run 1 | Run 2 | Run 3 | Run 4 |
|---|---|---|---|---|
| Monomers premix part B1 | | | | |
| MMA (methyl methacrylate) | | 30 | | |
| CHMA | 34.83 | | 41.7 | |
| VeoVa 9 | | | | 34.83 |
| Ethyl acrylate (EA) | 31.13 | 34.7 | 22 | 31.13 |
| Acrylic acid (AA) | 9.96 | 15 | 11.11 | 9.96 |
| Hydroxy ethyl methacrylate (HEMA) | 9.02 | 10.3 | 10.19 | 9.02 |
| 1,4-Butanediol dimethacrylate (BDDMA) | 15.06 | 10 | 15 | 15.06 |
| Tg range (DSC) ° C. | 60-65 | 60-65 | 85-90 | 55-60 |

Example 9: ASR Additive

This preparation was used in some of the coating compositions as an additive to improve substrate wetting performance.

A premix of 647.22 parts glacial acrylic acid (GAA), 359.5 parts ethyl acrylate (EA), 431.28 parts methyl methacrylate (MMA), 436.26 parts Butyl CELLOSOLVE, and 48.29 parts deionized water was prepared in a monomer premix vessel. In a separate vessel, an initiator premix of 86.34 parts LUPEROX™ 26 initiator from Arkema and 240 parts butyl CELLOSOLVE was prepared. To a reaction vessel equipped with a stirrer, reflux condenser, thermocouple, heating and cooling capability, and inert gas blanket, 512.75 parts butyl CELLOSOLVE and 25.15 parts deionized water were added. With agitation and an inert blanket, the reaction vessel was heated to 97 to 102° C. with reflux occurring. Once within the temperature range, 13.40 parts LUPEROX 26 initiator was added. Five minutes after the initiator addition, the monomer premix and the initiator premix were added simultaneously to the reaction vessel over three hours while maintaining the temperature range at 97 to 102° C. with reflux and cooling as needed. The ingredients were allowed to react an additional two hours. If the monomer conversion is not achieved at this stage, an additional initiator premix can be added to the vessel over one hour maintaining the temperature range of 97° C. to 102° C. Sixty minutes after the addition of the second initiator premix, the reaction vessel was cooled to less than 60° C. under agitation. This process yielded an acrylic ASR additive with solids of ~55.0% NVC, an acid number of ~300 mg KOH/g resin.

Example 10: ASR Additive

This preparation was used in some of the coating compositions as an additive to improve substrate wetting performance.

A premix of 647.22 parts glacial acrylic acid (GAA), 359.5 parts ethyl acrylate (EA), 431.28 parts cyclohexyl methacrylate (CHMA), 436.26 parts Butyl CELLOSOLVE, and 48.29 parts deionized water was prepared in a monomer premix vessel. In a separate vessel, an initiator premix of 86.34 parts LUPEROX™ 26 initiator from Arkema and 240 parts butyl CELLOSOLVE was prepared. To a reaction vessel equipped with a stirrer, reflux condenser, thermocouple, heating and cooling capability, and inert gas blanket, 512.75 parts butyl CELLOSOLVE and 25.15 parts deionized water were added. With agitation and an inert blanket, the reaction vessel was heated to 97 to 102° C. with reflux occurring. Once within the temperature range, 13.40 parts LUPEROX 26 initiator was added. Five minutes after the initiator addition, the monomer premix and the initiator premix were added simultaneously to the reaction vessel over three hours while maintaining the temperature range at 97 to 102° C. with reflux and cooling as needed. The ingredients were allowed to react an additional two hours. If the monomer conversion is not achieved at this stage, an additional initiator premix can be added to the vessel over one hour maintaining the temperature range of 97° C. to 102° C. Sixty minutes after the addition of the second initiator premix, the reaction vessel was cooled to less than 60° C. under agitation.

This process yielded an acrylic ASR additive with solids of ~55.0% NVC, an acid number of ~300 mg KOH/g resin.

Example 11: ASR Additive

This preparation was used in some of the coating compositions as an additive to improve substrate wetting performance.

A premix of 649.40 parts glacial acrylic acid (GAA), 360.71 parts ethyl acrylate (EA), 432.72 parts methyl methacrylate (MMA), 438.59 parts Butyl CELLOSOLVE, and 48.44 parts deionized water was prepared in a monomer premix vessel. In a separate vessel, an initiator premix of 86.63 parts LUPEROX™ 26 initiator from Arkema and 240 parts butyl CELLOSOLVE was prepared. To a reaction vessel equipped with a stirrer, reflux condenser, thermocouple, heating and cooling capability, and inert gas blanket, 514.47 parts butyl CELLOSOLVE and 15.77 parts deionized water were added. With agitation and an inert blanket, the reaction vessel was heated to 97 to 102° C. with reflux occurring. Once within the temperature range, 13.44 parts LUPEROX 26 initiator was added. Five minutes after the initiator addition, the monomer premix and the initiator premix were added simultaneously to the reaction vessel over three hours while maintaining the temperature range at 97 to 102° C. with reflux and cooling as needed. The ingredients were allowed to react an additional two hours. If the monomer conversion is not achieved at this stage, an additional initiator premix can be added to the vessel over one hour maintaining the temperature range of 97° C. to 102° C. Sixty minutes after the addition of the second initiator premix, the reaction vessel was cooled to less than 60° C. under agitation.

This process yielded an acrylic ASR additive with solids of ~55.0% NVC, an acid number of ~300 mg KOH/g resin.

Examples 12-20: Inside Spray Coating Compositions and Associated Articles

The coating compositions of Examples 12-20 were prepared from the latex emulsions of Example 8, Runs 1-4 using the ingredients and amounts indicated in the below Table 5. The ASR additives of Examples 9 and 10 were added in additive levels to improve application of the coating to substrate. Coating compositions were spray applied to the inside of aluminum beverage containers, cured, and evaluated. The coating composition ingredients were added in the order shown in Table 5 with agitation. Ingredients 2 and 3 were premixed before addition. Ingredient 7 was added as needed to obtain a desired final viscosity. All of the ingredient amounts indicated in the below Table 5 are weight parts.

TABLE 5

| | Inside Spray Coating Compositions | | | | | | | | | |
|---|---|---|---|---|---|---|---|---|---|---|
| | Spray Coating | Ex. 12 | Ex. 13 | Ex. 14 | Ex. 15 | Ex. 16 | Ex. 17 | Ex. 18 | Ex. 19 | Ex. 20 |
| | Notable "High" Tg Monomer | CHMA | CHMA | CHMA | MMA | MMA | CHMA | CHMA | Veo Va 9 | Veo Va 9 |
| | Latex Tg (° C.) range, DSC | 60-65 | 60-65 | 60-65 | 60-65 | 60-65 | 80-90 | 80-90 | 55-60 | 55-60 |
| | Crosslinker | None | Primid | Phenolic | None | Primid | None | Primid | None | Primid |
| Ingredient 1 | Ex. 8, Run 1 Latex | 1500.0 | 1500.0 | 1500.0 | | | | | | |
| | Ex. 8, Run 2 Latex | | | | 1500.0 | 1500.0 | | | | |
| | Ex. 8, Run 3 Latex | | | | | | 1500.0 | 1500.0 | | |
| | Ex. 8, Run 4 Latex | | | | | | | | 1540.0 | 1540.0 |
| Ingredient 2 | Deionized water | 900.0 | 900.0 | 940 | 1140.0 | 1140.0 | 930.0 | 930.0 | 1065.0 | 1065.0 |
| Ingredient 3 | DMEOA | 10.0 | 10.0 | 7.0 | 6.0 | 6.0 | 10.3 | 10.3 | 4.6 | 4.6 |
| Ingredient 4 | Water-Miscible Organic Solvents | 349 | 349 | 149 | 3500 | 350 | 349 | 349 | 356.4 | 356.4 |
| Ingredient 5 | Resole Phenolic Crosslinker | | | 66.0 | | | | | | |
| | Primid QM 1260 Crosslinker (EMS) | | 92.0 | | | 92.0 | | 91.0 | | 92 |
| Ingredient 6 | Ex. 10 ASR Additive | | | | 41.0 | 41.0 | 33.0 | 33.0 | 33.0 | 33.0 |
| | Ex. 11 ASR Additive | 33.0 | 33.0 | 33.0 | | | | | | |
| Ingredient 7 | DMEOA | As needed | As needed | As needed | As needed | As needed | As needed | As needed | As needed | As needed |
| | Viscosity in seconds using ASTM #2 cup at ambient temperature | 40 | 40 | 37 | 48 | 48 | 40 | 40 | 38 | 38 |

The coating compositions of Table 5 were sprayed into the interior of 33 cl (330 milliliter) aluminum beverage cans using typical laboratory conditions and a 100 to 140 mg/can dry coating weight (120 mg/can dry coating weight target), and cured at 180 to 200° C. (as measured at the can dome) for 30 to 60 seconds through a gas oven conveyor from Greenbank Technology Ltd. at typical heat schedules for this application. The application and film properties are shown in Table 6.

of Example 16 was smooth, whereas the film in these areas in Comparative Example A was rough.

The dry film coating thickness of most portions of a cured inside spray coating on an aluminum beverage can range from 2 to 5 microns, but certain portions of the inside spray coating typically have much thicker dry film coating thickness such as from 8 to 30 microns. If the coating is not properly formed in these thicker areas, it can cause a rough coating surface that can potentially act as nucleation sites for

TABLE 6

Inside Spray Coating Properties

|  | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|
| Notable "High" Tg Monomer | CHMA | CHMA | CHMA | MMA | MMA | CHMA high Tg | CHMA high Tg | Veo Va 9 | Veo Va 9 |
| Latex Tg ° C. range, DSC | 60-65 | 60-65 | 60-65 | 60-65 | 60-65 | 80-90 | 80-90 | 55-60 | 55-60 |
| Crosslinker | None | Primid | Phenolic | None | Primid | None | Primid | None | Primid |
| Initial Metal Exposure | <1 mA | <1 mA | <1 mA | <1 mA | <1 mA | <1 mA | <1 mA | <1 mA | <1 mA |
| Metal Exposure after Drop Damage (from initial) | >200 mA | 0.5 mA | 39.6 mA | >200 mA | 0.3 mA | >200 mA | 20.5 mA | >200 mA | 2.6 mA |
| Necking | Fail | Pass | Fail | No Data | No data | Fail | Fail | No Data | No data |
| Dome Reforming | Fail | Pass | Fail | No Data | No Data | Fail | Fail | No Data | No Data |
| Water Pasteurization | Pass | Pass | Pass | Fail | Pass | Pass | Pass | Pass | Pass |
| 3% Boiling Acetic acid | Pass | Pass | Pass | Fail | Pass | Pass | Pass | Fail | Pass |

Table 7 below compares a cured inside spray coating of Example 16 to a comparative cured inside spray coating ("Comparative Example A") formed from a coating composition that was identical to the composition of Example 16 except the ASR additive was omitted. The inside spray coating composition of Comparative Example A, prior to application, had a viscosity of 37 seconds (ASTM #2 cup at ambient temperature). The coating compositions were applied and cured the same as described above for Examples 12-20.

TABLE 7

Effect of ASR Additive on Inside Spray Beverage Can Coating Performance

| Inside Spray Coating | Ex. 16 | Comparative Example A |
|---|---|---|
| Initial Metal Exposure | <1 mA | <1 mA |
| Water Pasteurization | Pass | Pass |
| 3% Boiling Acetic acid | Pass | Pass |
| $CuSO_4$ exposure 24 hours % of corrosion after exposure* | 12% | 17% |
| Appearance on the high thickness area | Good | Poor |

*The coated cans were filled with an acidic solution of copper sulfate and were held for 24 hours under ambient conditions. The cans were then emptied and the metal exposure was assesed with a visual check of the corrosion to determine the percentage of corrosion on the entire interior of the can. The higher the percentage of corrosion, the less the can was protected and the more prone t would to fail while containing a packaged beverage product.

As indicated by the data in Table 7, the inside spray coating of Example 16, which included an ASR additive of the present invention exhibited superior copper sulfate corrosion resistance and a better appearance on the higher thickness areas of the coating. The film in these thicker areas carbon dioxide to escape from a packaged beverage, which can lead to foaming issues with carbonated beverages.

Thus, as indicated in Table 7, the film performance of a beverage can inside spray coating of Example 16 was superior relative to that of Comparative Example.

This application incorporates by reference the disclosure of the International Application entitled: "Acrylic Polymers and Compositions Containing Such Polymers," International Application No. PCT/US2017/057432, filed on 19 Oct. 2017, which also claims priority to U.S. Application No. 62/410,255, filed on 19 Oct. 2016.

The complete disclosure of all patents, patent applications, and publications (including material safety data sheets, technical data sheets and product brochures for the raw materials and ingredients used in the Examples), and electronically available material cited herein are incorporated herein by reference as if individually incorporated. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. All lists and examples provided herein are intended to be non-limiting unless specially indicated to the contrary. The invention illustratively disclosed herein suitably may be practiced, in some embodiments, in the absence of any element which is not specifically disclosed herein.

What is claimed is:

1. An aqueous inside spray food or beverage can coating composition, the coating composition comprising:

a resin system comprising an emulsion polymerized acrylic latex, wherein the resin system is at least partially preformed;

an alkali-soluble resin additive comprising an at least partially neutralized acid- or anhydride-functional organic solution polymerized acrylic polymer formed from an ethylenically unsaturated monomer component including an ethylenically unsaturated acid-functional monomer and a (meth)acrylate; and a nitrogen-containing carboxyl-reactive crosslinker;

wherein the coating composition comprises a physical blend of the emulsion polymerized acrylic latex and the alkali-soluble resin additive; and wherein the coating composition includes more than 50 wt-% of the emulsion polymerized acrylic latex, based on the total resin solids weight of the coating composition.

2. The coating composition of claim 1, wherein the emulsion polymerized acrylic latex and the alkali-soluble resin additive are not covalently attached to one another while present in the liquid coating composition prior to any cure of the coating composition.

3. The coating composition of claim 1, wherein the nitrogen-containing carboxyl-reactive crosslinker includes two or more amide groups.

4. The coating composition of claim 1, wherein the nitrogen-containing carboxyl-reactive crosslinker includes a poly-substituted amide group having two or more hydroxyl groups.

5. The coating composition of claim 1, wherein the nitrogen-containing carboxyl-reactive crosslinker comprises a beta-hydroxyalkylamide crosslinker.

6. The coating composition of claim 1, wherein the nitrogen-containing carboxyl-reactive crosslinker comprises:

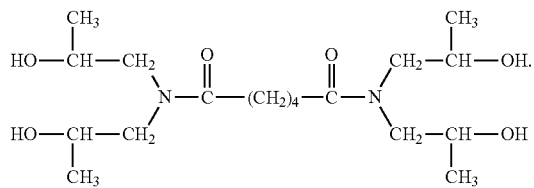

7. The coating composition of claim 1, wherein the nitrogen-containing carboxyl-reactive crosslinker includes a diimide group.

8. The coating composition of claim 1, wherein the nitrogen-containing carboxyl-reactive crosslinker includes a urethane group.

9. The coating composition of claim 1, wherein the coating composition includes 1 to 10 wt-% of the nitrogen-containing carboxyl-reactive crosslinker, based on the total resin solids of the coating composition.

10. The coating composition of claim 5, wherein the coating composition includes from 4 to 8.5 wt-% of the beta-hydroxyalkylamide crosslinker, based on the total resin solids of the coating composition.

11. The coating composition of claim 6, wherein the coating composition includes from 4 to 8.5 wt-% of the nitrogen-containing carboxyl-reactive crosslinker, based on the total resin solids of the coating composition.

12. The coating composition of claim 5, wherein the coating composition further comprises a resole phenolic crosslinker.

13. The coating composition of claim 1, wherein a cured coating exhibits a Tg of greater than about 60° C.

14. The coating composition of claim 5, wherein a cured coating exhibits a Tg of greater than about 60° C.

15. The coating composition of claim 13, where the emulsion polymerized acrylic latex has a Tg of greater than 50° C.

16. The coating composition of claim 1, where the emulsion polymerized acrylic latex has a Tg of greater than 50° C.

17. The coating composition of claim 1, wherein the acid- or anhydride-functional organic solution polymerized acrylic polymer is formed from an ethylenically unsaturated monomer component that includes acrylic acid.

18. The coating composition of claim 17, wherein the acid- or anhydride-functional organic solution polymerized acrylic polymer has an acid value of at least 40 mg KOH per gram of resin.

19. The coating composition of claim 1, wherein the coating composition is substantially free of each of styrene and bisphenol A.

20. The coating composition of claim 19, wherein the coating composition, when spray applied into an interior of a 330 milliliter aluminum beverage can at 100 to 140 milligrams per can dry weight and cured at 180 to 200° C. (as measured at the can dome) for 30 to 60 seconds, exhibits a metal exposure of less than 10 mA, when tested pursuant to a Metal Exposure After Drop Damage test.

21. The coating composition of claim 5, wherein the coating composition, when spray applied into an interior of a 330 milliliter aluminum beverage can at 100 to 140 milligrams per can dry weight and cured at 180 to 200° C. (as measured at the can dome) for 30 to 60 seconds, exhibits a metal exposure of less than 3.5 mA, when tested pursuant to a Metal Exposure After Drop Damage test.

22. The coating composition of claim 1, wherein the coating composition, when spray applied into an interior of a 330 milliliter aluminum beverage can at 100 to 140 milligrams per can dry weight and cured at 180 to 200° C. (as measured at the can dome) for 30 to 60 seconds, exhibits:
  (i) a global extraction result of less than 50 ppm; and
  (ii) a metal exposure of less than 2 mA on average when the can is filled with 1% NaCl in deionized water and tested pursuant to an Initial Metal Exposure test.

23. The coating composition of claim 22, wherein the coating composition includes an aqueous carrier comprising more than 5 weight percent of one or more organic solvents.

24. An aqueous inside spray beverage can coating composition, the coating composition comprising:
  more than 50 weight percent, based on total resin solids, of an at least partially neutralized acid- or anhydride-functional emulsion polymerized acrylic latex having a Tg of greater than 20° C.;
  an alkali-soluble resin additive comprising an at least partially neutralized acid- or anhydride-functional organic solution polymerized acrylic polymer formed from an ethylenically unsaturated monomer component including an ethylenically unsaturated acid-functional monomer and a (meth)acrylate;
  a beta-hydroxyalkylamide crosslinker; and
  an aqueous carrier comprising more than 5 weight percent of one or more organic solvents; and wherein the coating composition is substantially free of each of styrene and bisphenol A and comprises a physical blend of the emulsion polymerized acrylic latex and the alkali-soluble resin additive;

wherein the emulsion polymerized acrylic latex is at least partially preformed.

25. The coating composition of claim 24, wherein the coating composition includes a catalyst comprising a phosphorus compound.

26. The coating composition of claim 24, wherein the coating composition, when spray applied into an interior of a 330 milliliter aluminum beverage can at 100 to 140 milligrams per can dry weight and cured at 180 to 200° C. (as measured at the can dome) for 30 to 60 seconds, exhibits:
   (i) a global extraction result of less than 50 ppm; and
   (ii) a metal exposure of less than 2 mA on average when the can is filled with 1% NaCl in deionized water and tested pursuant to an Initial Metal Exposure test.

27. The coating composition of claim 26, wherein the acid- or anhydride-functional organic solution polymerized acrylic polymer is formed from an ethylenically unsaturated monomer component that includes acrylic acid, and wherein the acid- or anhydride-functional organic solution acrylic polymer has an acid value of at least 40 mg KOH per gram of resin.

28. The coating composition of claim 27, wherein the beta-hydroxyalkylamide crosslinker comprises:

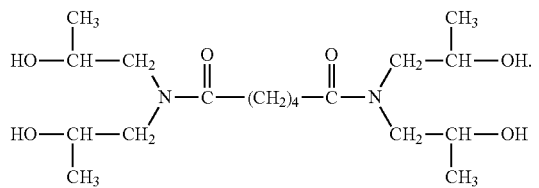

29. An aqueous inside spray food or beverage can coating composition, the coating composition comprising:
   a resin system comprising an emulsion polymerized acrylic latex;
   an alkali-soluble resin additive comprising an at least partially neutralized acid- or anhydride-functional organic solution polymerized acrylic polymer formed from an ethylenically unsaturated monomer component including an ethylenically unsaturated acid-functional monomer and a (meth)acrylate; and
   a nitrogen-containing carboxyl-reactive crosslinker;
      wherein the coating composition comprises a physical blend of a preformed resin system and the alkali-soluble resin additive; and
   wherein the coating composition includes more than 50 wt-% of the emulsion polymerized acrylic latex, based on the total resin solids weight of the coating composition.

30. An aqueous coating composition suitable for use in forming an adherent thermoset coating onto a metal substrate, the coating composition comprising:
   an aqueous carrier containing greater than 5% by weight of one or more organic solvents based on the weight of the aqueous carrier;
   a resin system comprising an emulsion polymerized acrylic latex; and
   an alkali-soluble resin additive having a number average molecular weight of at least 1,000;
   wherein the coating composition comprises a physical blend of a preformed resin system and the alkali-soluble resin additive; and
   wherein the coating composition includes more than 50 wt-% of the emulsion polymerized acrylic latex, based on the total resin solids weight of the coating composition.

* * * * *